United States Patent
Wang et al.

(10) Patent No.: US 12,465,228 B2
(45) Date of Patent: *Nov. 11, 2025

(54) SMART WATCH AND METHOD FOR MEASURING HEART RATE

(71) Applicant: BOE TECHNOLOGY GROUP CO., LTD., Beijing (CN)

(72) Inventors: Tieshi Wang, Beijing (CN); Xueling Gao, Beijing (CN); Zhiqiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 403 days.

This patent is subject to a terminal disclaimer.

(21) Appl. No.: 18/082,610

(22) Filed: Dec. 16, 2022

(65) Prior Publication Data

US 2023/0120967 A1   Apr. 20, 2023

Related U.S. Application Data

(63) Continuation-in-part of application No. 16/415,282, filed on May 17, 2019, now Pat. No. 11,547,312.

(30) Foreign Application Priority Data

Aug. 28, 2018  (CN) .................. 201821389435.X

(51) Int. Cl.
*H04W 12/00*   (2021.01)
*A61B 5/00*   (2006.01)
(Continued)

(52) U.S. Cl.
CPC .......... *A61B 5/02433* (2013.01); *A61B 5/681* (2013.01); *G02B 6/424* (2013.01);
(Continued)

(58) Field of Classification Search
CPC ................ A61B 5/02433; A61B 5/681; A61B 2562/0219; A61B 5/0205; A61B 5/02427;
(Continued)

(56) References Cited

U.S. PATENT DOCUMENTS 10,238,305 B2 *  3/2019  Hingorani .......... A61B 5/02438
10,998,101 B1 *  5/2021  Tran ...................... G16H 50/30
(Continued)

OTHER PUBLICATIONS

Non-Final Office Action mailed May 27, 2022, for U.S. Appl. No. 16/415,282, filed May 17, 2019, 13 pages.
(Continued)

*Primary Examiner* — Andrew Wendell
(74) *Attorney, Agent, or Firm* — XSENSUS LLP

(57) ABSTRACT

The present disclosure provides a smart watch and a method for measuring heart rate information. The smart watch includes a dial, a watchband, and a processing device disposed on the dial or inside the watchband. The processing device includes an optical emitter configured to emit light; an optical receiver configured to receive reflected light, the reflected light being generated by the light emitted by the optical emitter irradiating a skin for conversion into an electrical signal; and a processor configured to process the electrical signal to obtain heart rate information of a user.

17 Claims, 14 Drawing Sheets

(51) Int. Cl.
*A61B 5/024* (2006.01)
*G02B 6/42* (2006.01)
*G04G 9/00* (2006.01)
*G04G 21/02* (2010.01)

(52) U.S. Cl.
CPC ........... *G04G 9/007* (2013.01); *G04G 21/025* (2013.01); *A61B 2562/0219* (2013.01)

(58) Field of Classification Search
CPC .. A61B 5/02438; G02B 6/424; G02B 6/3608; G02B 6/3644; G02B 6/4249; G04G 9/007; G04G 21/025; G04G 9/0064; H04W 12/33
See application file for complete search history.

(56) References Cited

U.S. PATENT DOCUMENTS

| | | | |
|---|---|---|---|
| 11,547,312 B2* | 1/2023 | Wang | G04G 21/025 |
| 2013/0266420 A1 | 10/2013 | Kidane et al. | |
| 2016/0004224 A1* | 1/2016 | Pi | G04G 21/025 368/10 |
| 2017/0032168 A1 | 2/2017 | Kim | |
| 2017/0216667 A1* | 8/2017 | Garvey | A61B 5/00 |
| 2018/0317785 A1 | 11/2018 | MacDonald et al. | |
| 2018/0364557 A1* | 12/2018 | Park | H04N 23/651 |
| 2019/0059756 A1* | 2/2019 | Rasmussen | A61B 5/002 |
| 2020/0188732 A1* | 6/2020 | Kruger | G06F 3/0346 |
| 2020/0343433 A1 | 10/2020 | Boukai et al. | |
| 2022/0022758 A1* | 1/2022 | Eggers | G16H 40/20 |

OTHER PUBLICATIONS

Notice of Allowance mailed Sep. 15, 2022, for U.S. Appl. No. 16/415,282, filed May 17, 2019, 8 pages.

* cited by examiner

SMART WATCH AND METHOD FOR MEASURING HEART RATE

CROSS-REFERENCE TO RELATED APPLICATIONS

The present application is a Continuing-in-part Application of U.S. application Ser. No. 16/415,282 filed on May 17, 2019, which is based upon and claims the benefit of and priority to Chinese Patent Application No. 201821389435.X, filed on Aug. 28, 2018, which is incorporated herein by reference in its entirety.

TECHNICAL FIELD

The present disclosure relates to a field of smart wearable technology and, particularly, relates to a smart watch and a method for measuring a heart rate.

BACKGROUND

With the increasing development of wireless technology, smart wearable devices are gradually being favored. The development of smart watches is relatively mature. One of the main functions of the smart watches is to measure a heart rate (pulse) and provide a real-time detection for human health.

Currently, the main structure of the smart watches in the related art includes a dial, a watchband, and a measuring apparatus for measuring the heart rate. The measuring apparatus is disposed on the back surface of the dial, that is, on the surface of the dial in contact with a skin of a wrist, and the heart rate of a user is measured through blood vessels in the back of the wrist.

The actual use indicates that an accuracy of measuring the heart rate by the smart watches in the related art is relatively low.

SUMMARY

According to one aspect of the present disclosure, a smart watch is provided in an embodiment of the present disclosure, including a dial, a watchband, and a processing device. The watchband is connected with the dial. The processing device is disposed on the dial or inside the watchband. The processing device includes an optical emitter configured to emit light; an optical receiver configured to receive reflected light, the reflected light being generated by the light emitted by the optical emitter irradiating a skin for conversion into an electrical signal; and a processor connected to the optical emitter and the optical receiver, respectively, configured to process the electrical signal to obtain heart rate information of a user.

According to another aspect of the present disclosure, a method for measuring heart rate information is provided in the present disclosure, using a smart watch for measurement. The smart watch includes a dial, a watchband; and a processing device disposed on the dial or inside the watchband, the processing device comprising an optical emitter, an optical receiver, and a processor connected the optical emitter and the optical receiver, respectively.

The method for measuring heart rate information includes:
emitting, by the optical emitter, light;
receiving, by the optical receiver, reflected light that is generated by the light irradiating a skin for conversion into an electrical signal; and
processing, by the processor, the electrical signal to obtain heart rate information of a user.

According to another aspect of the present disclosure, a method for measuring heart rate information is provided in the present disclosure, using a smart watch for measurement. The smart watch includes a dial; a watchband; a processing device disposed on the dial or inside the watchband, the processing device comprising an optical emitter, an optical receiver, and a processor connected the optical emitter and the optical receiver, respectively; an accelerometer sensor; and a gyroscope sensor.

The method for measuring heart rate information includes:
detecting and obtaining, by the accelerometer sensor, motion information of the user;
sending, by the accelerometer sensor, the motion information to the processor;
detecting and obtaining, by the gyroscope sensor, angular velocity information of the user;
sending, by the gyroscope sensor, the angular velocity information to the processor;
receiving, by the processor, the motion information and the angular velocity information; and
generating, by the processor, motion-tolerant heart rate information by combining the motion information and the angular velocity information with heart rate information.

According to another aspect of the present disclosure, a method for measuring heart rate information is provided in the present disclosure, using a smart watch for measurement. The smart watch includes a dial, a watchband, a blood vessel information collecting device and a processing device. The blood vessel information collecting device is disposed in the watchband and is configured to collect blood vessel information from the inner side of a wrist of a user. The processing device is connected with the blood vessel information collecting device and is configured to receive and process the blood vessel information to obtain heart rate information of the user. The blood vessel information collecting device includes a transmitting optical fiber, a receiving optical fiber, and a fixing apparatus. The transmitting optical fiber is disposed in the watchband and is configured to have an input end and an output end. The receiving optical fiber is disposed in the watchband and is configured to have a receiving end and a transmitting end. The fixing apparatus is configured to fix the output end of the transmitting optical fiber and the receiving end of the receiving optical fiber.

The method further includes:
the processing device generating an infrared light;
the infrared light being sent to the transmitting optical fiber through the input end of the transmitting optical fiber and being transmitted in the transmitting optical fiber;
the infrared light being emitted from the output end of the transmitting optical fiber and irradiating onto a skin of the inner side of the wrist of the user to form a reflected light on the skin;
the reflected light being sent to the receiving optical fiber through the receiving end of the receiving optical fiber and being transmitted in the receiving optical fiber;
the reflected light being sent to the processing device through the transmitting end of the receiving optical fiber;
the processing device processing the reflected light to obtain the heart rate information.

Understandably, implementing any one of the products or methods of the present disclosure does not necessarily require all of the advantages described above to be achieved at the same time. Other characteristics and advantages of the present disclosure will be set forth in the following specification, and partly will be apparent from the specification or understood by implementing the present disclosure. The objectives and other advantages of the present disclosure can be achieved and obtained by the structure particularly pointed out in the specification, claims, and accompanying drawings.

BRIEF DESCRIPTION OF THE DRAWINGS

The accompanying drawings are used to provide a further understanding of the technical solutions of the present disclosure, and constitute a part of the specification. The accompanying drawings are used to explain the technical solutions of the present disclosure together with the present application, and do not constitute a limitation of the technical solutions of the present disclosure. The shapes and sizes of the various components in the accompanying drawings do not reflect true proportions, and are merely intended to illustrate the content of the present disclosure.

DETAILED DESCRIPTION

A detailed description of the embodiments of the present disclosure is further described below in conjunction with the accompanying drawings. The following is used to illustrate the present disclosure, but is not used to limit the scope of the present disclosure. It should be noted that, in case of no conflict, characteristics in the present application can be arbitrarily combined with each other.

Smart watches in the related art of the field have a low accuracy in measuring a heart rate. The reason is that blood vessels in the back of a wrist are buried deeply, and a blood volume of each blood vessel is quite different. Therefore, there is a large error in measuring the heart rate by detecting the blood vessels on the back of the wrist. In addition, a layout of a measuring apparatus is limited and a measurable area is small due to a limited area of a dial, thereby the error is large. Therefore, a smart watch that can more accurately detect the heart rate is provided in the present disclosure.

It should be understood that the heart rate or heart rate information described in this disclosure can also be referred to as pulse or pulse information.

Figure 1:
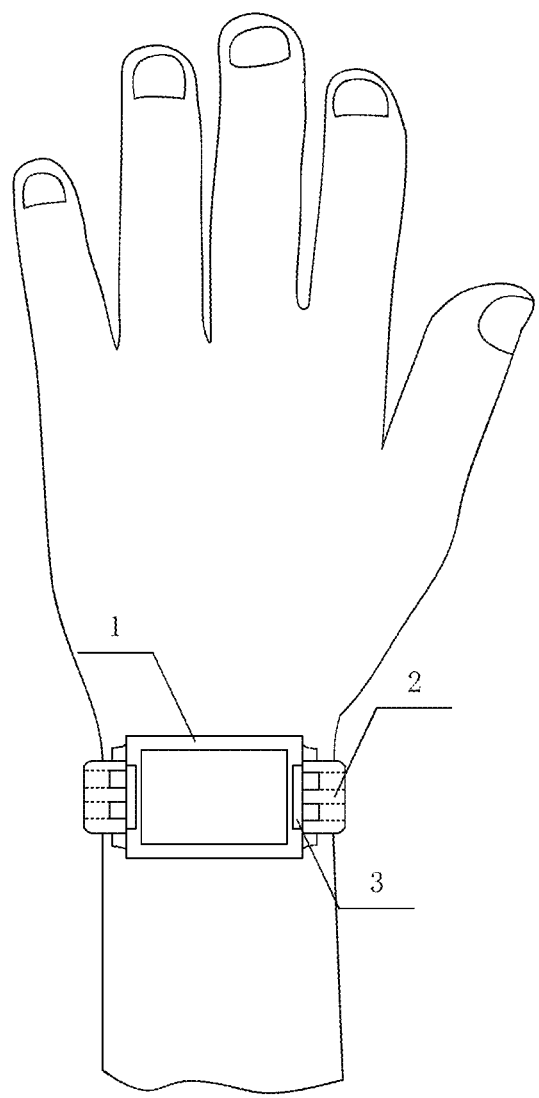
FIG. 1 is a structural schematic view of a using state of a smart watch according to an embodiment of the present disclosure.
Figure 2:
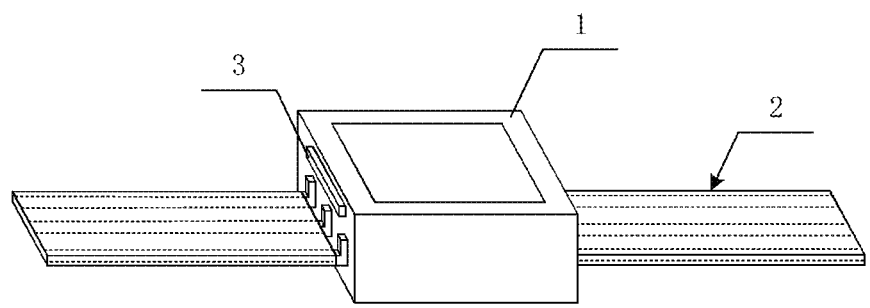
FIG. 2 is a structural schematic view of a unfolded state of a smart watch according to an embodiment of the present disclosure.

FIG. 1 is a structural schematic view of a using state of the smart watch of the present disclosure. FIG. 2 is a structural schematic view of an unfolded state of the smart watch of the present disclosure. As shown in FIGS. 1 and 2, the main structure of the smart watch of the present disclosure includes a dial 1, a watchband 2, and a processing device 3.

In some embodiments, the dial 1 integrates a basic functional framework of the smart watch of the present disclosure. The basic functional framework includes, but is not limited to, a core processing module, an information transmission module, a user interaction module, and a sensor module.

Figure 3:
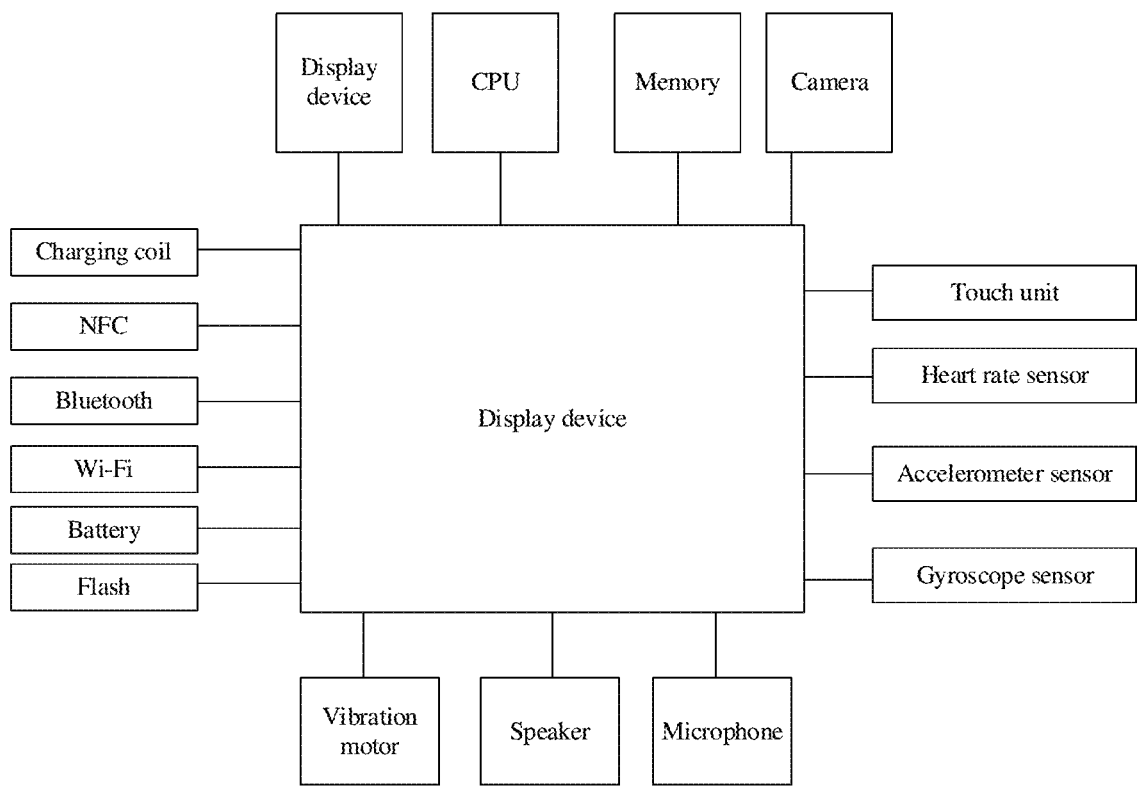
FIG. 3 is a schematic view of a basic functional framework integrated with a smart watch of the present disclosure.
Figure 4:
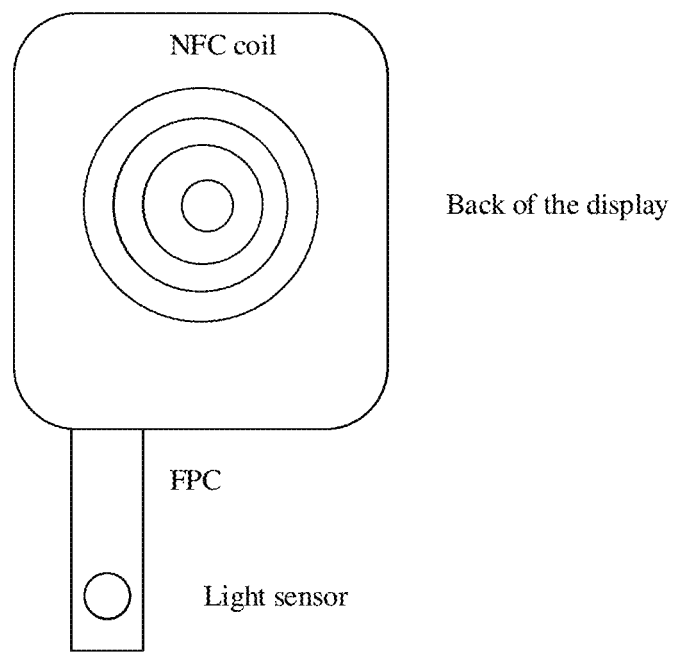
FIG. 4 is a structural schematic view of a display device of a smart watch of the present disclosure.

As shown in FIG. 3, the core processing module may include a CPU, memory, flash, etc.; the information transmission module may include charging coil, Near Field Communication (NFC), Bluetooth, Wi-Fi, etc.; the user interaction module may include display, camera, touch unit, speaker, and microphone, etc.; the sensor module may include a heart rate sensor, an accelerometer sensor, a gyroscope sensor, and a light sensor (as shown in FIG. 4). In some embodiments, the heart rate sensor in the sensor module can be used as a processing device 3 in the smart watch as shown in FIGS. 1 and 2 to detect the heart rate.

In some embodiments, the display is used to display the time, weather, and may also be used to display feedback information containing heart rate information, text messages, phone calls, and navigation. As shown in FIG. 4, the back of the display, i.e., the surface facing the user's wrist side, may be provided with an NFC coil for near field communication technologies such as proximity identification and card reading. The display components of the display are connected in a bound manner to a Flexible Printed Circuit (FPC) board with one or more light sensors integrated to sense external light. In some embodiments, the NFC coil and the light sensor may be provided separately and not integrated in the display.

In some embodiments, the smart watch may make sound through a speaker in the basic functional framework. The speaker may be a piezoelectric ceramic speaker employing a piezoelectric ceramic crystal. The piezoelectric ceramic crystal expands and contracts when energized. When the piezoelectric ceramic speaker is connected to the motherboard, the digital signal processed by the CPU is sent to the DAC module in the motherboard, which causes the DAC module to convert the digital signal into an analog signal or an acoustic signal, and subsequently, the converted signal is sent to the piezoelectric ceramic speaker for producing sound. Since the piezoelectric ceramic speaker has the advantages of ultra-thin and simple structure, the smart watch using the piezoelectric ceramic speaker can reduce its own thickness and increase the battery capacity.

In some embodiments, the smart watch of the present disclosure can be equipped with the sensor module including, but not limited to, the following three types of sensors: a health monitoring type sensor, a motion support type sensor, and an auxiliary type sensor.

In some embodiments, the health monitoring type sensors may include sensors such as:
an optical heart rate sensor configured to detect the number of heart beats per minute;
a SpO2 monitor configured to measure the amount of oxygen contained in the blood;
a bioimpedance sensor configured to measure, for example, respiratory rate and sleep;
an Electrocardiography (ECG) sensor configured to detect the tiny electrical impulses emitted by the user's heart during each heartbeat;
a UV sensor configured to convert UV signals to electrical signals using photosensitive devices to measure exposure to harmful sunlight;
a skin temperature sensor configured to detect slight changes in temperature, for example, to detect whether the user will develop a fever or, for example, whether the user's menstrual period has started.
An electrodermal activity (EDA) sensor configured to measure stress levels in conjunction with a heart rate tracker, ECG sensor and skin temperature sensor; and
a blood glucose sensor configured to use an electrochemical reaction of an agent with glucose molecules on the skin to generate an electric current to measure the blood glucose level in the body. The agent can be a gel, set on the back of the smart watch, for contact with the user's skin. For example, there are two electrodes in the gel, and when used, the circuit is switched on and a microcurrent is generated through the skin of the body. The charged ions in the skin are moved towards the positive and negative electrodes by the current, and the glucose molecules in the tissue fluid are "trapped" by the charged ions and move together into the gel. The blood glucose sensor calculates the current blood glucose level by measuring the reaction of the glucose molecules with an enzyme (glucose oxidase) in the gel to display the results on the smart watch screen.

In some embodiments, the motion support type sensors may include sensors such as:
a three-axis accelerometer configured to detect the movement of the user and track the direction;
an altimeter configured to detect the user's climbing height;
a compass configured to help the user determine direction and identify maps;
a Global Position System (GPS) configured to detect the amount of movement of the user (e.g., running), the location of the wearable device, and also to track the user's activity with the user's consent, and also to guide the Map application, etc.;
a Gyroscope sensor, which may also be called an angular velocity accelerometer, configured to detect in real time the angular velocity of the user's movement; and
a magnetometer configure to determine, together with GPS and the compass, the exact coordinates of the user's location.

In some embodiments, the auxiliary type of sensors may include sensors such as:
an ambient light sensor configured to adjust the display brightness and help conserve battery life;
a proximity sensor configured to conserve battery and wake up the display when needed; and
a gesture sensor configured to detect wrist movement.

The above three types of sensors are divided according to their respective functions and application scenarios, but of course, they can also be classified in other ways which are not limited in the embodiments of the present disclosure.

In some embodiments, the basic functional framework integrated in the dial 1 also includes battery, motor, etc.

On the basis of the above-mentioned dial with integrated basic functional framework, the technical solutions of the present disclosure are described in detail below through specific embodiments.

First Embodiment

As shown in FIGS. 1 and 2, the watchband 2 is disposed on both sides of the dial 1 and connected with the dial 1 for the user to wear the dial 1 on an outer side of the wrist. The processing device 3 is provided on the dial 1 to obtain the user's pulse information, i.e. heart rate information. In some embodiments, the processing device 3 can also be provided inside the watchband 2.

Figure 5:
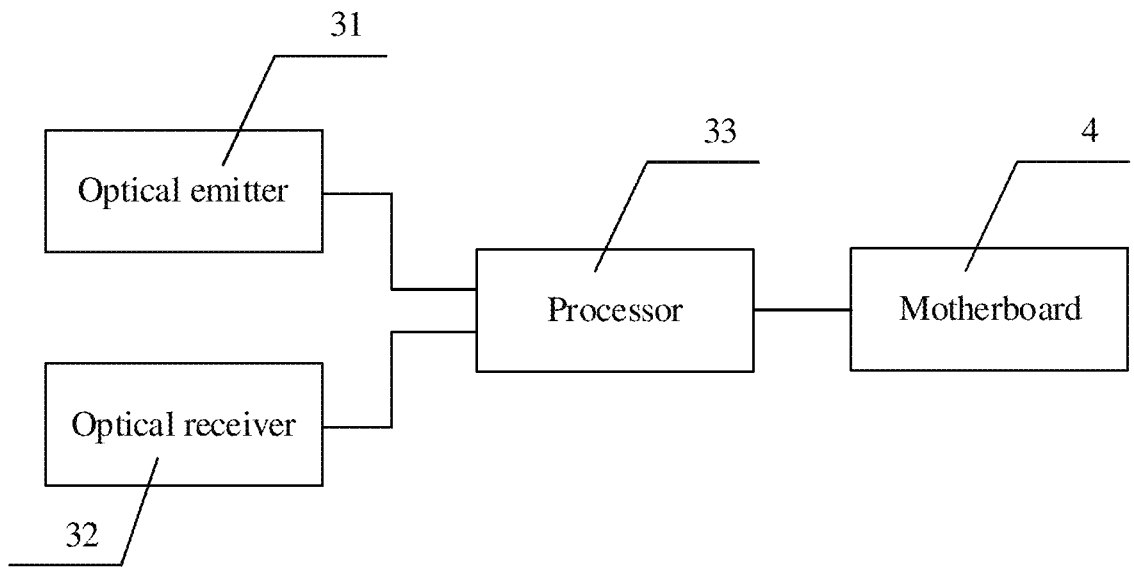
FIG. 5 is a structural schematic view of a processing device according to a first embodiment of the present disclosure.
Figure 6:
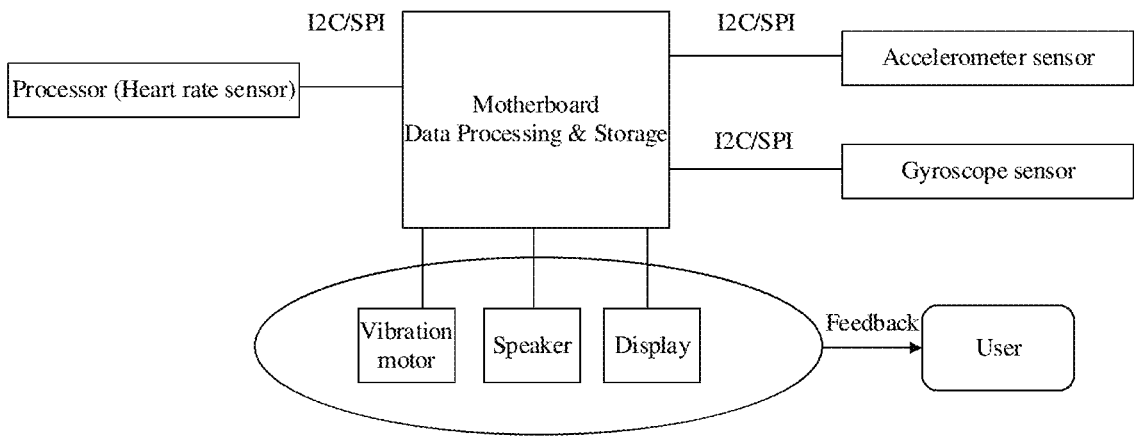
FIG. 6 is a structural schematic view of a processing device according to a second embodiment of the present disclosure.
Figure 7:
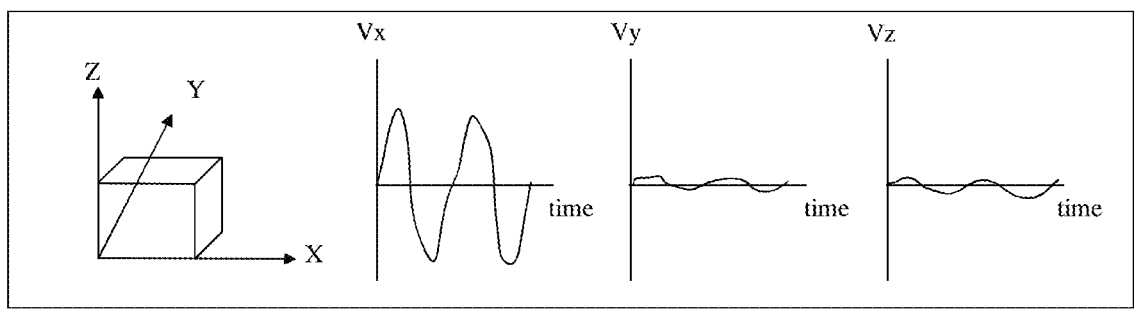
FIG. 7 is a waveform diagram detected by an accelerometer sensor of the present disclosure.

As shown in FIG. 5, the main structure of the processing device 3 includes an optical emitter 31, an optical receiver 32, and a processor 33 connected to the optical emitter 31 and the optical receiver 32, respectively. The optical emitter 31 is configured to emit light. The optical receiver 32 is configured to receive reflected light, which is generated by the light emitted by the light emitter 31 upon irradiation of the skin for conversion into an electrical signal. The processor 33 is configured to control the optical emitter 31 to emit light and to process the electrical signal to obtain heart rate information.

In some embodiments, when a photosensitive sensor is provided in the optical receiver 32, the reflected light is converted into an electrical signal via the photosensitive sensor provided in the optical receiver 32.

For example, in the present disclosure, the optical emitter 31 generates LED light to irradiate onto the skin, which is reflected through the skin to produce reflected light, the reflected light is received by the photosensitive sensor provided in the optical receiver 32 and converted into an electrical signal, and then the electrical signal is sent to the processor 33 and processed by the processor 33 to obtain the user's heart rate information.

In other embodiments, the photosensitive sensor may also be provided in the processor 33, and the reflected light is propagated to the processor 33 through the optical receiver 32, converted into an electrical signal by the photosensitive sensor in the processor 33, and processed by the processor 33 to obtain the use's heart rate information.

In some embodiments, the processor 33 is provided with an analog-to-digital (AD) converter that converts the electrical signal to a digital signal to obtain heart rate information.

The following is a detailed description of the principle of processor 33 obtaining heart rate information, using the processor 33 as an example of a heart rate sensor.

The amount of reflected light received by the heart rate sensor is proportional to the electrical signal obtained by conversion of reflected light: when the amount of reflected light is stable, the electrical signal obtained by conversion of reflected light also remains stable; the more the amount of reflected light, the more the electrical signal obtained by conversion of reflected light; the less the amount of reflected light, the less the electrical signal obtained by conversion of reflected light. And the number of heart beats can be detected according to the change of the electrical signal. Since the intensity of each pulse corresponding to the LED light (e.g., green light) generated by the optical emitter 41 is changed each time it is reflected and sent to the heart rate sensor, the heart rate sensor can detect the continuous beating of the heart for a short period of time (one instant) and the time difference between two adjacent beats, i.e., Inter-Beat Interval (IBI).

For example, the present disclosure calculates IBI based on the difference between the center values of the rising segments of two adjacent pulse waves, thereby calculating the value of Beat Per Minute (BPM), which is the unit of heart rate detection, and the calculated BPM value is used to represent the heart rate, i.e., the heart rate information described above.

In some embodiments, the BPM may be calculated according to the following formula:

$$X = (60*1000)*\frac{\text{(Number of } R \text{ waves} - 1)}{\text{(Last } R \text{ wave orientation} - \text{First } R \text{ wave orientation)}}$$

Here, X indicates the value of BPM, i.e. heart rate; R wave is each wave peak of the heartbeat in the preset buffer (e.g., it can contain 4000 detections); "Last R wave orientation−first R wave orientation" indicates how many wave peaks are separated between the last R wave and the first R wave, or how many milliseconds are separated between the last R wave and the first R wave if the sampling rate is 1000.

In some embodiments, the processor 33 is configured to control the smart watch to send a first reminder message based on the heart rate information, the first reminder message being configured to alert the user of the heart rate information.

As shown in FIG. 5, the processing device 3 can be connected to the motherboard 4 through the processor 33 or installed on the motherboard 4. The processor 33 can use the Inter-Integrated Circuit (I2C) protocol or Serial Peripheral Interface (SPI) protocol to communicate and transmit data with the motherboard 4. For example, the processor 33 sends the obtained user's heart rate information to the cache of the motherboard 4 for subsequent control of the display device according to the heart rate information to display the first reminder message, or for subsequent control of the vibration motor according to the heart rate information for vibration. Of course, the heart rate information can also be first stored to memory (e.g., flash). The first reminder message may include the user's heart rate information.

In some embodiments, the processing device 3 may also include a data storage device (not shown) to store the user's historical data.

In some embodiments, the processing device 3 can be set to real-time detection or single detection through software settings to save power and increase the usage time of the smart watch.

In this embodiment, positions of the optical transmitter, the optical receiver and the processor can be flexibly disposed according to the dial structure. For example, the processor can be disposed either inside the dial or on a side of the dial. When the processor is disposed on the side of the dial, it can be connected to the optical emitter and the optical receiver through signal lines. In another example, the optical transmitter and optical receiver may be disposed on the same side of the dial or may be respectively disposed on both sides of the dial, as long as the dial is in a convenient location to be connected with the watchband, and the optical transmitter and the optical receiver are in a convenient location to be connected with the optical fiber. In actual use, the optical emitter may adopt a photoelectric device capable of producing LED light, such as light emitting diode, etc. The optical receiver may adopt an optoelectronic means capable of converting the optical signal into the electrical signal, such as a photodiode, a phototransistor, or a combination of the photodiode and the phototransistor. The processor may adopt a digital signal processing (DSP) chip, which is not particularly limited in the present embodiment thereto.

Second Embodiment

This embodiment is an extension of the preceding first embodiment, and the main structure of the smart watch includes a dial, a watchband, and a processing device. The processing device includes an optical transmitter, an optical receiver, and a processor connected to the optical transmitter and the optical receiver, respectively. Based on the aforementioned first embodiment, the smart watch is also configured with other sensors that cooperate with the processing device to achieve heart rate detection in various scenarios. This embodiment is introduced as an example in which the smart watch is also configured with an accelerometer sensor and a gyroscope sensor.

The accelerometer sensor is configured to detect and obtain motion information of the user. The motion information includes at least one of the following information: direction information of the user, location information of the user, and speed variation rate of the user.

The gyroscope sensor is configured to detect and obtain angular velocity information of the user.

In some embodiments, the processor is connected to the accelerometer sensor and the gyroscope sensor, respectively. In this case, the accelerometer sensor is configured to send the motion information to the processor; the gyroscope sensor is configured to send the angular velocity information to the processor.

Accordingly, the processor is configured to: receive the motion information and the angular velocity information; generate motion-tolerant heart rate information by combining the motion information and the angular velocity information with the heart rate information; and control the smart watch to send a second reminder message in response to the motion-tolerant heart rate information exceeding a first threshold; or, control the smart watch to send a second reminder message in response to the motion-tolerant heart rate information exceeding a second threshold for a predetermined period of time, wherein the first threshold and the second threshold are the same or different, and the second reminder message is configured for reminding the user of the motion-tolerant heart rate information.

The first threshold and the second threshold can be pre-configured according to the actual circumstances, without any specific limitation in this disclosure.

In some embodiments, based on the motion information obtained by the accelerometer sensor and the angular velocity information obtained by the gyroscope sensor, the smart watch can accurately detect the movement of the user, such as the change in velocity of the user moving in a linear direction by the motion information and the change in angular velocity of the user moving in a non-linear direction by the angular velocity information. The smart watch can combine the heart rate information with the movement of the user to send out reminder messages (or, alert messages) related heart rate. For example, when detecting that the user's heart rate is too fast, the smart watch controls the accelerometer sensor and gyroscope sensor to detect the user's movement at this time, and if the smart watch determines that the user is still in high-intensity and high-velocity movement based on the movement feedback from the accelerometer sensor and gyroscope sensor, it displays the user's heart rate information at this time through the display device and reminds the user that the user's heart rate is too fast at this time and that the exercise can be reduced.

Figure 8:
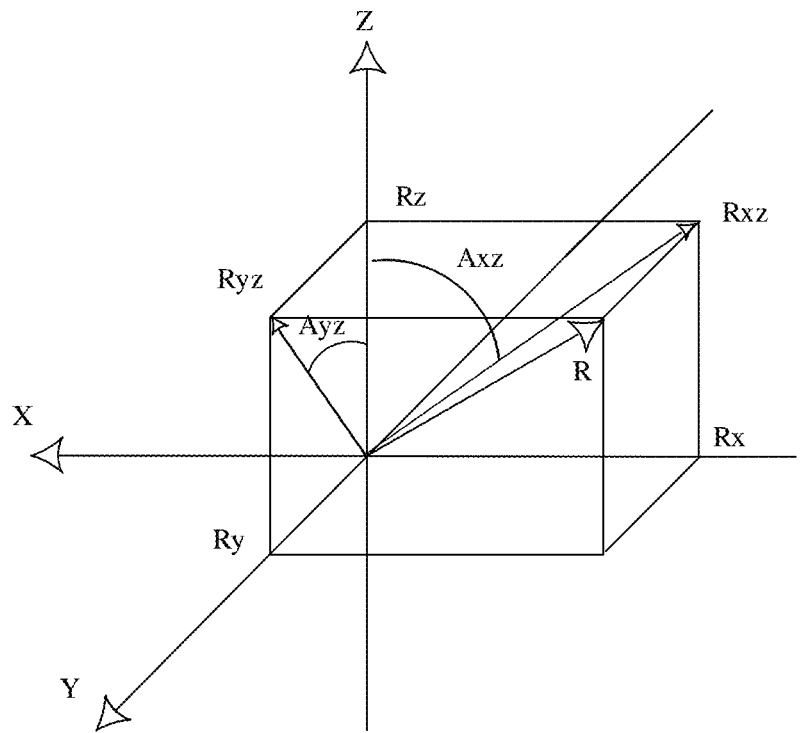
FIG. 8 is a schematic view of a force vector measured by an accelerometer sensor of the present disclosure.

As shown in FIG. 8, Rxz is the projection of vector R in the XZ plane, Ryz is the projection of vector R in the YZ plane, and the angle between Rz and Rxz and the angle between Rz and Ryz are used to indicate the direction of the user's movement.

Here, the angle Axz between Rz and Rxz is that Axz=a tan (RX/RZ), the angle Ayz between Rz and Ryz is that Ayz=a tan (RY/RZ), RX is the component of the vector R in the direction of the x-axis, RY is the component of the vector R in the direction of the y-axis, and RZ is the component of the vector R in the direction of the z-axis.

The sensitivity unit of accelerometer sensor 5 is usually LSB/g. For example, when the sensitivity of the accelerometer sensor is set to 16384 LSB/g and the read acceleration data of X and Z axes are 1122 and 16674, RX=1122 LSB/(16384 LSB/g)=0.068 g, RZ=16674 LSB/(16384 LSB/g)=1.018 g, and Axz=a tan(0.068 g/1.018 g)=0.0667 rad.

The principle of data processing by the gyroscope sensor 6 is as follows.

Taking the gyroscope sensor 6 of this disclosure as a Micro-Electro-Mechanical System (MEMS) device, for example, since the MEMS device is a fine mechanical structure that can be driven by electrostatic force, and when it vibrates, if rotation occurs, it will generate a displacement in the orthogonal direction due to the Koch force, producing a capacitance change. Since this displacement is proportional to the angular velocity of rotation, the gyroscope sensor 7 detects this capacitance change and converts it into a digital signal that is sent to the processor for subsequent processing.

Figure 9:
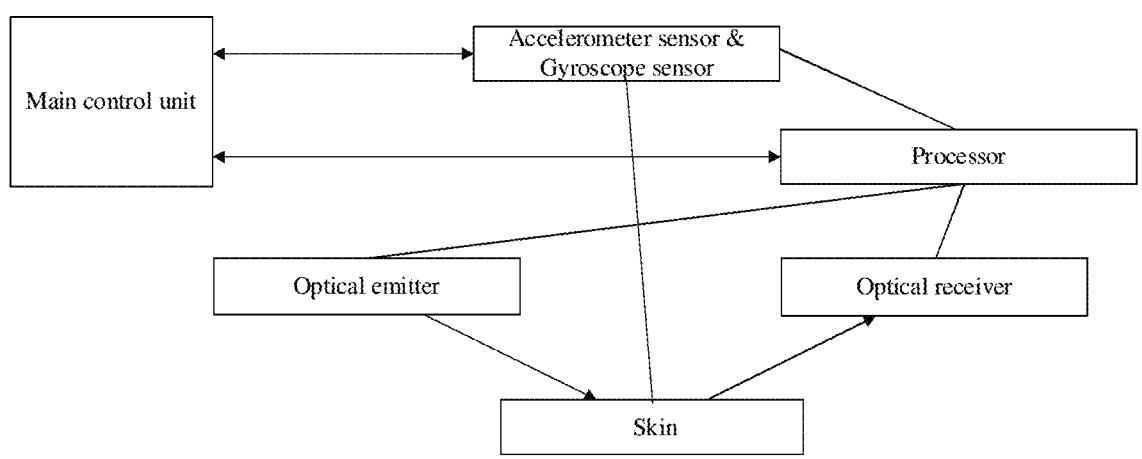
FIG. 9 is a structural schematic view of a processing device of the present disclosure in combination with an accelerometer sensor and a gyroscope sensor to measure heart rate.

FIG. 9 is a structural schematic view of a processing device of the present disclosure in combination with an accelerometer sensor and a gyroscope sensor to measure heart rate.

In some embodiments, the optical emitter 31 typically includes at least two light emitting diodes (LEDs) to irradiate light waves into the interior of the skin.

In some embodiments, photodiodes and an analog front end (AFE) are provided at the processor 33 or optical receiver 32 to capture light reflected by the user and to convert these analog signals into digital signals for calculating heart rate data that can be practically applied.

In some embodiments, the processor is further configured to use the heart rate information together with the motion information and the angular velocity information as input to a PhotoPlethysmoGraphy (PPG) algorithm; and generate the motion-tolerant heart rate information by: processing the heart rate information, the motion information, and the angular velocity information using the PPG algorithm, and superimposing the processed information onto a PPG waveform.

For example, since the accelerometer sensor as well as the gyroscope sensor can measure the user's movement, the motion information obtained by the accelerometer sensor and the angular velocity information obtained by the gyroscope sensor can be used in conjunction with the heart rate information obtained by the processor as input to the PhotoPlethysmoGraphy (PPG) algorithm applied by the processor.

The processor, by using the PPG algorithm, can process the motion information, angular velocity information, and heart rate information and then superimpose the processed information (signal) onto the PPG waveform, thereby generating continuous, motion-tolerant heart rate data and other biometric data, i.e., motion-tolerant heart rate information.

Figure 10:
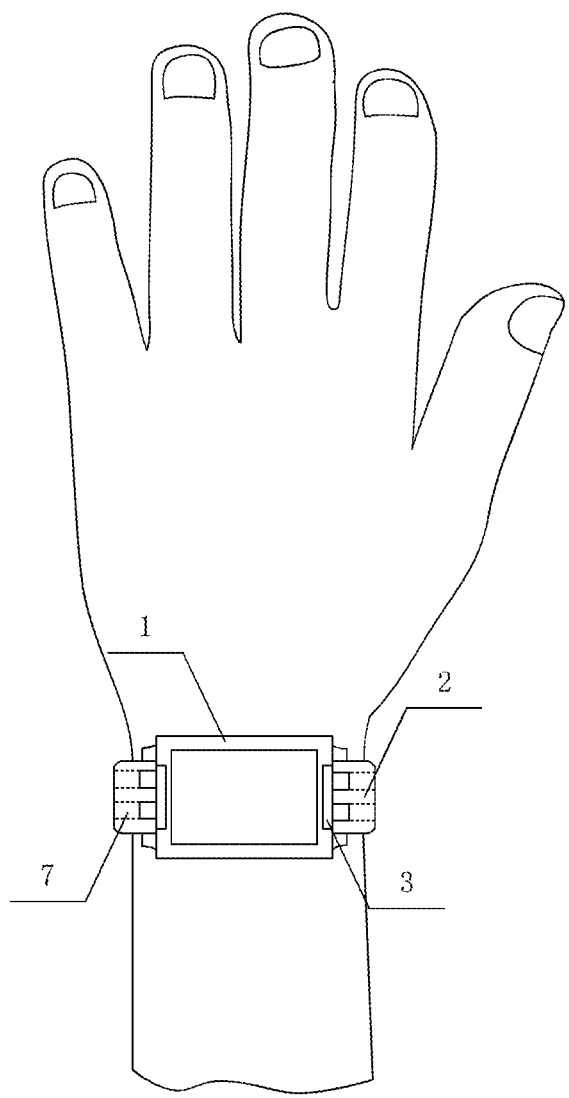
FIG. 10 is a structural schematic view of a using state of a smart watch according to another embodiment of the present disclosure.
Figure 11:
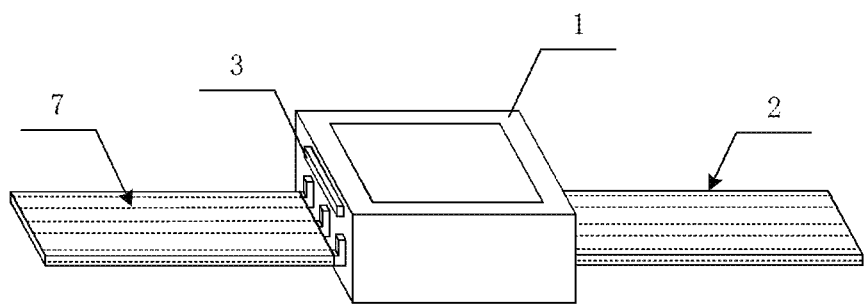
FIG. 11 is a structural schematic view of a unfolded state of a smart watch according to another embodiment of the present disclosure.

In some embodiments, the main structure of the smart watch of this disclosure can also include a blood vessel information collecting device 7. As shown in FIGS. 9 and 10, the watchband 2 is disposed on both sides of the dial 1 and connected with the dial 1 for the user to wear the dial 1 on an outer side of the wrist. The blood vessel information collecting device 7 is disposed in the watchband 2 for collecting a blood vessel information in the inner side of the wrist of the user and transmits the collected blood vessel information to the processing device 3. The processing device 3 is disposed on the dial 1 and connected with the blood vessel information collecting device 7 for receiving the blood vessel information transmitted by the blood vessel information collecting device 7, and obtains a pulse information (e.g., the heart rate information) of the user according to the blood vessel information.

In the present disclosure, the outer side of the wrist of the user refers to a wrist area on a side back of the hand, and the inner side of the wrist refers to the other wrist area that does not include the outer side of the wrist. The inner side of the wrist includes a wrist area on a side of the palm. The present disclosure collects the blood vessel information in the inner side of the wrist of the user by disposing the blood vessel information collecting device in the watchband. Since the blood vessels in the inner side of the wrist are buried shallowly and a blood volume of each blood vessel is uniform, the smart watch of the present disclosure can collect a more accurate blood vessel information. The accuracy of measuring the heart rate information is relatively high. In addition, since the blood vessel information collecting device is disposed in the watchband, not only an area that can be disposed is large and convenient to lay out, but also the blood vessel information of multiple areas of the wrist can be collected. The accuracy of the heart rate information measurement is further improved. Further, the present disclosure can directly obtain the heart rate information of the user by disposing the processing device on the dial without external device assistance. It is convenient and quick to use, suitable for all kinds of people, and has good application prospects.

The technical solutions of the present disclosure in which the smart watch equipped with a blood vessel information collecting device, will be described in detail below through particular embodiments.

Third Embodiment

Figure 12:
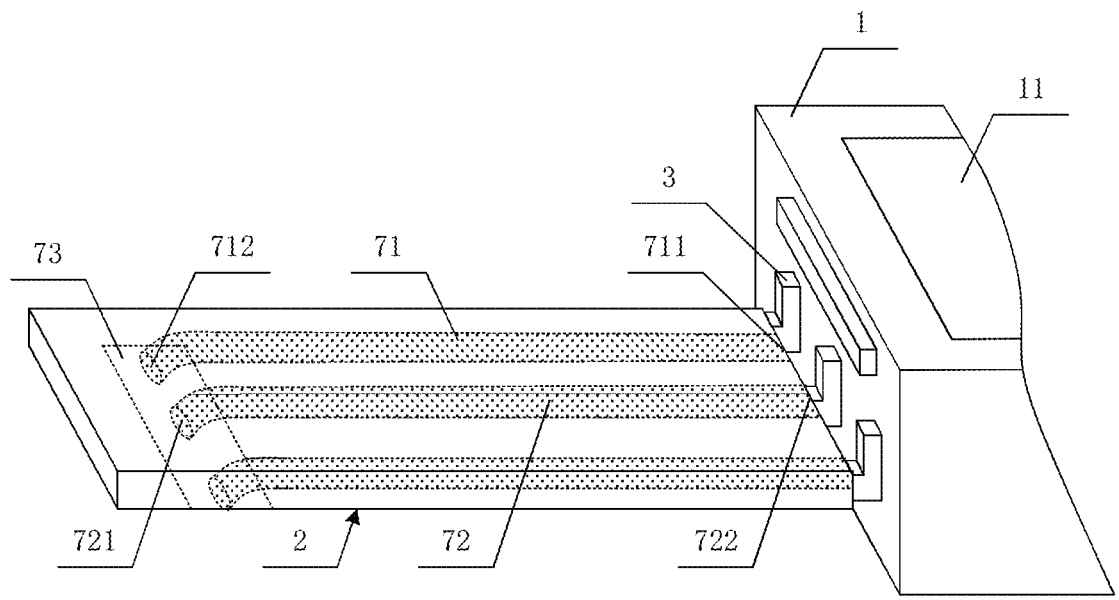
FIG. 12 is a structural schematic view of a transmitting optical fiber and a receiving optical fiber according to a third embodiment of the present disclosure.
Figure 13:
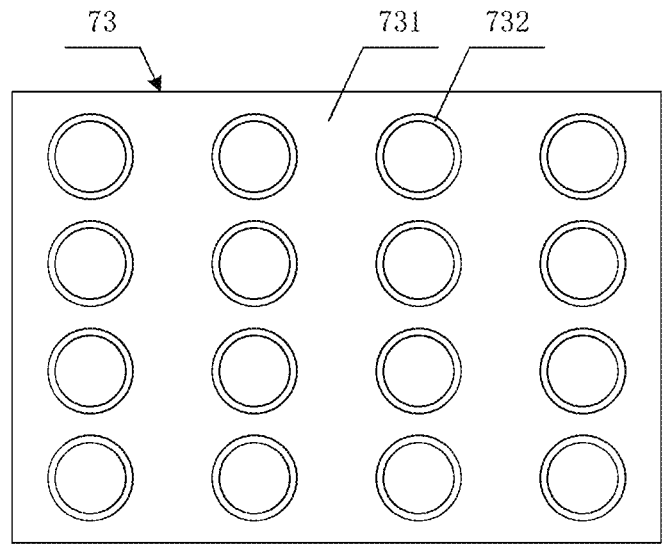
FIG. 13 is a structural schematic view of a fixing device according to the third embodiment of the present disclosure.
Figure 14:
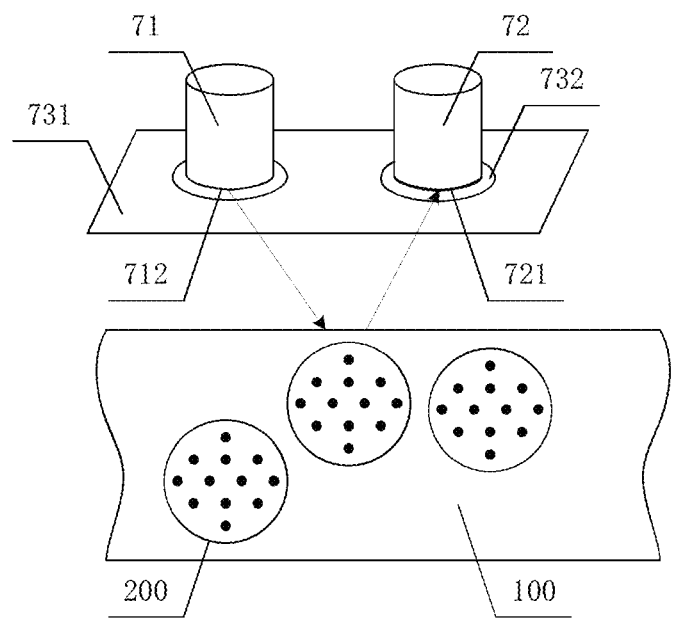
FIG. 14 is a structural schematic view of a blood vessel information collecting device according to the third embodiment of the present disclosure.

FIGS. 12 to 14 are structural schematic views of the third embodiment of the present disclosure. Among them, FIG. 12 is a structural schematic view of a transmitting optical fiber and a receiving optical fiber of the third embodiment of the present disclosure. FIG. 13 is a structure schematic view of a fixing device of the third embodiment of the present disclosure. FIG. 14 is a structural schematic view of the blood vessel information collecting device of the third embodiment of the present disclosure. As shown in FIG. 12, the main structure of the blood vessel information collecting device of the present embodiment includes the transmitting optical fiber 71, the receiving optical fiber 72, and the fixing device 73. A plurality of transmitting optical fibers 71 and receiving optical fibers 72 are all disposed inside the watchband 2 and extends along a length direction of the watchband 2. An input end 711 of each transmitting optical fiber 71 is connected with the processing device 3. An output end 712 of each transmitting optical fiber 71 is connected with the fixing device 73. A receiving end 721 of each receiving optical fiber 72 is connected with the fixing device 73. A transmitting end 722 of each receiving optical fiber 72 is connected with the processing device 3.

As shown in FIG. 13, the main structure of the fixing device 73 of the present embodiment includes a fixing plate 731 and fixing rings 732. The fixing plate 731 is mounted on a surface of the watchband 2 facing the wrist skin, and a plurality of through holes are disposed thereon. Each of the through holes is provided with the fixing ring 732 for fixing an end of the optical fiber (the output end of the transmitting optical fiber and the receiving end of the receiving optical fiber). The output end 712 of the transmitting optical fiber 71 and the receiving end 721 of the receiving optical fiber 72 are configured to extend through the through holes respectively and fixed by the fixing ring 732. Both an end face of the output end 712 of the transmitting optical fiber 71 and an end face of the receiving end 721 of the receiving optical fiber 72 are parallel to a plane of the fixing plate 731, that is, parallel to a surface of the wrist skin of its position. In actual implementation, the fixing plate may be one or more fixing plates, which are disposed at a certain position or multiple different positions of the watchband according to actual needs to collect the blood vessel information in a particular area or multiple areas of the inner side of the wrist. The fixing plate may be adopted as having a shape, such as a rectangle, a circle, or an ellipse. The number and position of the through holes can be arranged according to actual needs or implementation requirements. The plurality of through holes are arranged in a form of a matrix when the plurality of through holes are disposed in the fixing plate. In order to facilitate the collection, each fixing plate is provided with an even number of through holes. Two adjacent through holes are formed a collection point. One of the two adjacent through holes is sleeved on the output end of the transmitting optical fiber, and the other through hole is sleeved on the receiving end of the receiving optical fiber.

As shown in FIG. 14, the transmitting optical fiber 71 and the receiving optical fiber 72 are respectively fixed on the fixing plate 731 through the fixing rings 732. The input end (not shown) of the transmitting optical fiber 71 is connected with the processing device. The transmitting end (not shown) of the receiving optical fiber 72 is connected with the processing device. An infrared light generated by the processing device enters the transmitting optical fiber 71 from the input end of the transmitting optical fiber 71 and transmitted via the transmitting optical fiber 71. The infrared light is emitted from the output end 712 of the transmitting optical fiber 71 and irradiated onto a skin 100 on the inner side of the wrist of the user. A reflected light returned from the skin 100 enters the receiving optical fiber 72 from the receiving end 721 of the receiving optical fiber 72 and is transmitted via the receiving optical fiber 72. The reflected light is output to the processing device through the transmitting end of the receiving optical fiber 72. The processing device processes the reflected light to obtain the heart rate information of the user after receiving the reflected light.

Figure 15:
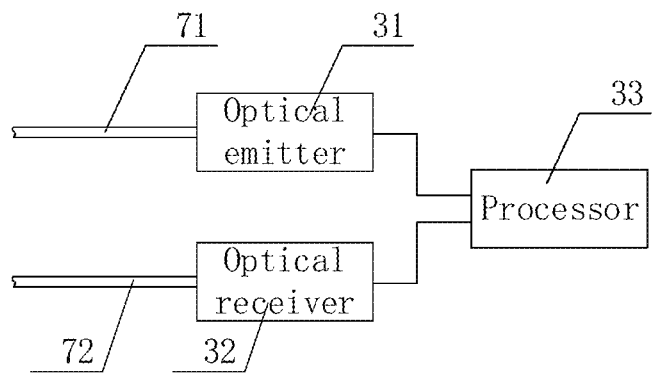
FIG. 15 is a structural schematic view of a processing device according to the third embodiment of the present disclosure.

FIG. 15 is a structural schematic view of the processing device of the third embodiment of the present disclosure. As shown in FIG. 15, the main structure of the processing device 3 includes an optical transmitter 31, an optical receiver 32, and a processor 33 connected with the optical transmitter 31 and the optical receiver 32, respectively. The optical transmitter 31 is connected with the transmitting optical fiber 71 and the optical receiver 32 is connected with the receiving optical fiber 72. In the embodiment, the optical transmitter 31 is configured to generate the infrared light under a control of the processor 33. The infrared light is transmitted via the transmitting optical fiber 71 and is illuminated onto the skin on the output end of the transmitting optical fiber. The optical receiver 32 is configured to receive the reflected light transmitted from the receiving optical fiber 72 under the control of the processor 33. The reflected light is first converted to an electrical signal and, then, the electrical signal is transmitted to the processor 33. The processor 33 processes the electrical signal to obtain the heart rate information of the user.

As shown in FIGS. 12 to 15, a principle of obtaining the heart rate information in the present embodiment is that, when a certain intensity of the infrared light generated by the optical transmitter 31 is irradiated onto the skin 100, blood cells in a subcutaneous venous blood vessel 200 will absorb some of the infrared light. Thus, in the reflected light returned from the skin 100, the reflected light of the position subcutaneously distributed with venous blood vessel 200 is significantly reduced. Also, a distribution of the subcutaneous venous blood vessel 200 can be known according to the received reflected light, and the processing device can calculate the pulse (heart rate) information of the user through the blood vessel information collecting device by collecting a distributed data of a series of subcutaneous venous blood vessel in different areas and at different times. A display screen 11 may be disposed on the dial 1. The processing device 4 is connected with the display screen 11 to send the obtained heart rate information of the user to the display screen 11 for presentation to the user. The principle, technical implementation, etc. for obtaining the heart rate information through a blood vessel measurement are technologies that all well known to those skilled in the art and will not be described herein.

In the present embodiment, positions of the optical transmitter, the optical receiver, and the processor can be flexibly disposed according to the dial structure. For example, the processor can be disposed either inside the dial or on a side of the dial. When the process is disposed on the side of the dial, it can be connected to the optical transmitter and the optical receiver through signal lines. In another example, the optical transmitter and the optical receiver may be disposed on the same side of the dial or may be respectively disposed on both sides of the dial, as long as the dial is in a convenient location to be connected with the watchband, and the optical transmitter and the optical receiver are in a convenient location to be connected with the optical fiber. In actual use, the optical transmitter may adopt an optoelectronic means capable of generating the infrared light, such as a light emitting diode, a light emitting audion, or a combination of the light emitting diode and the light emitting audion. The optical receiver may adopt an optoelectronic means capable of converting the optical signal into the electrical signal, such as a photodiode, a phototransistor, or a combination of the photodiode and the phototransistor. The processor may adopt a digital signal processing (DSP) chip, which is not particularly limited in the present embodiment thereto.

In the present embodiment, the transmitting optical fiber emitting the infrared light to the skin of a disposed position and the receiving optical fiber receiving the reflected light from the skin of the disposed position are ensured through disposing the fixing device that is configured to fix the input end of the transmitting optical fiber and the receiving end of the receiving optical fiber on the watchband, which ensures operational reliability. In the smart watch structure of the related technology in the art, since the measuring apparatus is disposed on the back of the dial, only a single collecting position is used and the collecting area is small, thereby there is a relatively large error. In contrast, the present embodiment can dispose a plurality of fixing devices on the watchband to achieve the collection of the blood vessel information in multiple areas of the wrist. It is beneficial to eliminate the errors caused by the different burial depth of blood vessels in different areas and the uneven blood volume in each blood vessel. Meanwhile, since the blood vessels in the inner side of the wrist are buried shallowly and the blood volume of each blood vessel is uniform, a more accurate blood vessel information can be collected. In combination with the above technical means, the present disclosure maximizes to improve the accuracy of the pulse information measurement.

Fourth Embodiment

Figure 16:
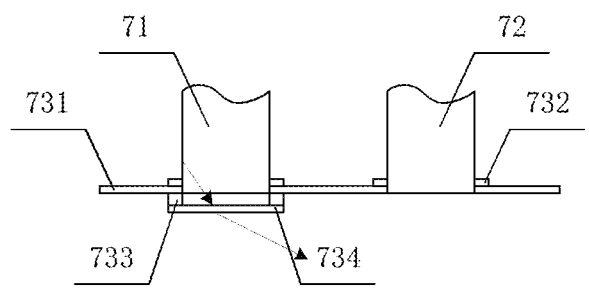
FIG. 16 is a structural schematic view of a fixing device according to a fourth embodiment of the present disclosure.

The present embodiment is an extension of the foregoing first embodiment. The main structure of the smart watch is the same as the foregoing third embodiment, and includes the dial, the watchband, the blood vessel information collecting device, and the processing device. The blood vessel information collecting device includes the transmitting optical fiber, the receiving optical fiber, and the fixing device. Different from the foregoing third embodiment, the fixing device of the present embodiment further includes a diffusing device. FIG. 16 is a structural schematic view of the fixing device of the fourth embodiment of the present disclosure. As shown in FIG. 16, the fixing device of the present embodiment includes the fixing plate 731, the fixing ring 732, a fixing block 333, and the diffusing device 334. The structures of the fixing plate 731 and the fixing ring 732 are the same as that of the foregoing third embodiment. The diffusing device 734 is disposed on a surface of the fixing plate 731 facing the skin and is connected with the fixing plate 731 through the fixing block 733. The diffusing device 734 is disposed at a position corresponding to the transmitting optical fiber 71. The diffusing device 734 of the present embodiment is configured to increase the exit angle of the infrared light output from the transmitting optical fiber 71. The range of the infrared light irradiating on the skin is expanded. The collection efficiency is improved by increasing the area of the irradiation area.

In one embodiment, the diffusing device can be adopted a diffuser. Generally, the diffuser includes a material having a high light transmittance as a substrate. Scattering particles are added into the substrate to cause multiple refractions, reflections, and scattering when the light passing to achieve an effect of light diffusion. In another embodiment, the diffusing device may be adopted a multilayer composite structure. For example, the diffusing device includes an antistatic layer, a polyethylene terephthalate (PET) layer, and a diffusion layer which are sequentially stacked. In yet another embodiment, the diffusing device may also be adopted a concave lens made of glass or plastic.

The present embodiment not only has the technical effects of the foregoing third embodiment, but also the irradiation area irradiated with the infrared light on the skin can be expanded and the collection efficiency is effectively improved through disposing the diffusing device in the blood vessel information collecting device. Further, static interference on the skin surface can be eliminated while achieving light diffusion through adopting the diffusing device of a multilayer composite structure. The collection quality is improved.

Fifth Embodiment

Figure 17:
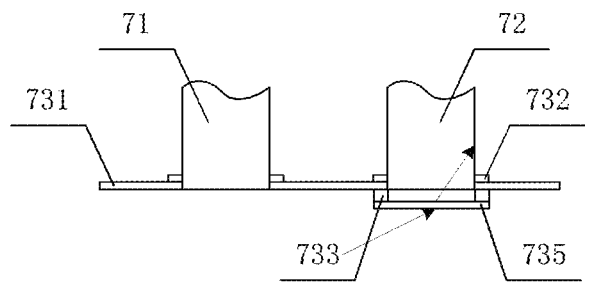
FIG. 17 is a structural schematic view of a fixing device according to an fifth embodiment of the present disclosure.

The present embodiment is an extension of the foregoing third embodiment. The main structure of the smart watch is the same as the foregoing third embodiment, and includes the dial, the watchband, the blood vessel information collecting device, and the processing device. The blood vessel information collecting device includes the transmitting optical fiber, the receiving optical fiber, and the fixing device. Different from the foregoing third embodiment, the fixing device of the present embodiment further includes a spotlight device. FIG. 17 is a structural schematic view of the fixing device of the fifth embodiment of the present disclosure. As shown in FIG. 17, the fixing device of the present embodiment includes the fixing plate 731, the fixing ring 732, the fixing block 733, and the spotlight device 735. The structures of the fixing plate 731 and the fixing ring 732 are the same as that of the foregoing third embodiment. The spotlight device 735 is disposed on a surface of the fixing plate 731 facing the skin and is connected with the fixing plate 731 through the fixing block 733. The spotlight device 735 is disposed at a position corresponding to the receiving optical fiber 72. The spotlight device 735 of the present embodiment is configured to increase an angle at which the receiving optical fiber 72 receives the reflected light. An increase in the angle at which the reflected light is received refers to an area of the collection area being expanded. The collection efficiency can be improved. In the present embodiment, the spotlight device may also be adopted a convex lens made of glass or plastic.

The present embodiment not only has the technical effects of the foregoing third embodiment, but also the area of the collecting area can be expanded and the collection efficiency is effectively improved through disposing the spotlight device in the blood vessel information collecting device.

Sixth Embodiment

Figure 18:
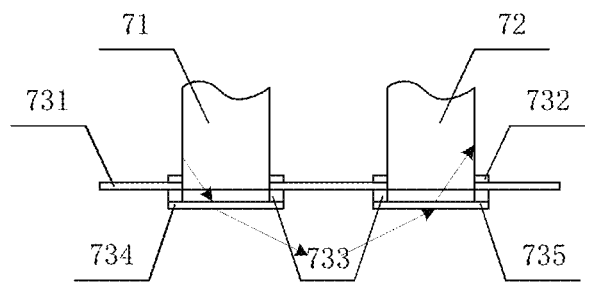
FIG. 18 is a structural schematic view of a fixing device according to a sixth embodiment of the present disclosure.

The present embodiment is a combination of the foregoing fourth embodiment and the fifth embodiment. The fixing device of the present embodiment includes the diffusing device and the spotlight device. FIG. 18 is a structural schematic view of the fixing device of the sixth embodiment of the present disclosure. As shown in FIG. 18, the fixing device of the present embodiment includes the fixing plate 731, the fixing ring 731, the fixing block 733, the diffusing device 734, and the spotlight device 735. The diffusing device 734 and the spotlight device 735 are both disposed on a surface of the fixing plate 731 facing the skin. The diffusing device 734 is disposed on a position corresponding to the transmitting optical fiber 71 and is connected with the fixing plate 731 through the fixing block 733. The spotlight device 735 is disposed on a position corresponding to the receiving optical fiber 72 and is connected with the fixing plate 731 through the fixing block 733. In the embodiment, the diffusing device 734 is configured to increase the exit angle of the infrared light output from the transmitting optical fiber 71 to expand the range of the infrared light irradiating on the skin. The spotlight device 735 is configured to increase the angle at which the receiving optical fiber 72 receives the reflected light to expand the area of the collecting area. In the present embodiment, the diffusing device and the spotlight device may adopt the structures of the foregoing fourth embodiment and the fifth embodiment, respectively.

The present embodiment not only has the technical effects of the foregoing third embodiment, but also the irradiation area irradiated with the infrared light on the skin can be expanded by the diffusing device, and the area of the collection area can be expanded by the spotlight device through disposing the diffusing device and the spotlight device in the blood vessel information collecting device. The collection efficiency is maximally improved.

Seventh Embodiment

Although the foregoing third to sixth embodiments are described in a configuration in which the transmitting optical fiber and the receiving optical fiber are juxtaposed in the blood vessel information collecting device; however, the blood vessel information collecting device of the present disclosure may also be implemented by adopting another structural form. As long as the transmitting optical fiber can transmit the infrared light to the skin and the receiving optical fiber is capable of receiving the reflected light from the skin are ensured. The present disclosure is not particularly limited thereto. For example, in the blood vessel information collecting device of the present embodiment, the transmitting optical fiber and the receiving optical fiber are configured to adopt a structure in which the transmitting optical fiber and the receiving optical fiber are disposed opposite to each other.

Figure 19A:
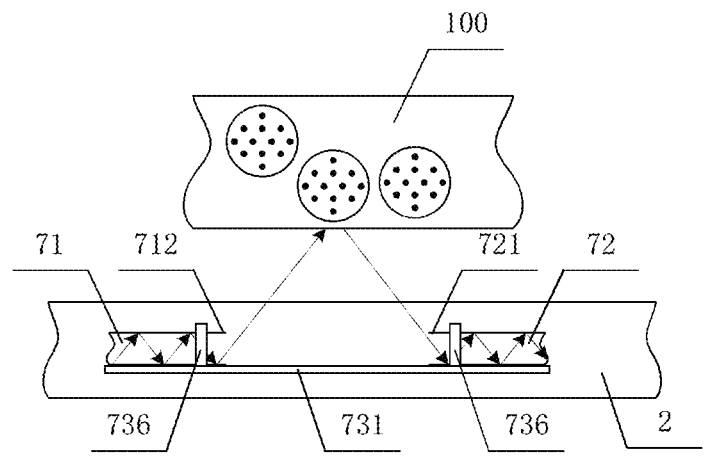
FIGS. 19a to 19c are structural schematic views of a fixing device according to a seventh embodiment of the present disclosure.
Figure 19B:
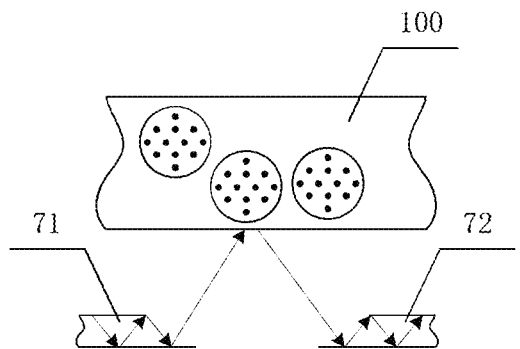
Figure 19C:
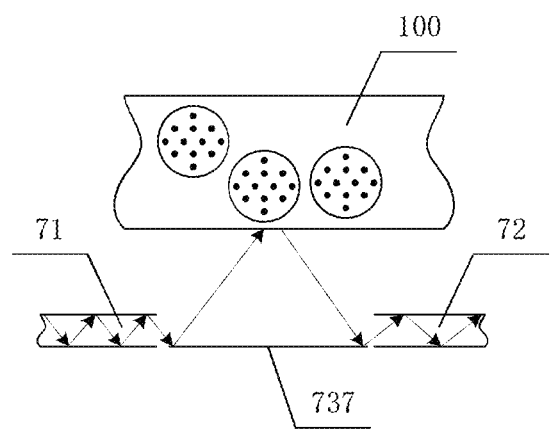

FIGS. 19a to 19c are structural schematic views of the fixing device of the seventh embodiment of the present disclosure. As shown in FIG. 19a, the main structure of the smart watch of the present embodiment is the same as that of the foregoing embodiments, and includes the dial, the watchband, the blood vessel information collecting device, and the processing device. The blood vessel information collecting device includes the transmitting optical fiber, the receiving optical fiber, and the fixing device. A plurality of transmitting optical fibers and receiving optical fibers are all disposed inside the watchband and extend along the length direction of the watchband. The input end of each transmitting optical fiber is connected with the processing device, and the output end is connected with the fixing device. The receiving end of each receiving optical fiber is connected with the fixing device, and the transmitting end is connected with the processing device. Different from the foregoing embodiments, the main structure of the fixing device includes the fixing plate 731 and a fixing band 736. The fixing plate 731 is disposed inside the watchband 2. The transmitting optical fiber 71 and the receiving optical fiber 72 are disposed on the fixing plate 731. The output end 712 of the transmitting optical fiber 71 and the receiving end 721 of the receiving optical fiber 72 are respectively fixed on the fixing plate 731 by the fixing band 736. Also, the output end 712 of the transmitting optical fiber 71 and the receiving end 721 of the receiving optical fiber 72 are oppositely disposed with a disposed distance therebetween. In the present embodiment, the end face of the output end 712 of the transmitting optical fiber 71 and the end face of the receiving end 721 of the receiving optical fiber 72 are both perpendicular to a plane of the fixing plate 731, that is, perpendicular to a surface of the wrist skin of its position. In actual implementation, the fixing plate may be one or more, which are disposed at a certain position or multiple different positions of the watchband according to actual needs to collect the blood vessel information of a specific area or multiple areas of the wrist. The fixing plate may adopt a shape, such as a rectangle, a circle, an ellipse, etc.

In the present embodiment, the infrared light generated by the processing device enters the transmitting optical fiber 71 from the input end of the transmitting optical fiber 71 and is transmitted via the transmitting optical fiber 71. The infrared light is emitted from the output end 712 of the transmitting optical fiber 71 to irradiate to the skin 100 of the inner side of the user's wrist. The reflected light reflected from the skin 100 enters the receiving optical fiber 72 from the receiving end 721 of the receiving optical fiber 72 and is transmitted via the receiving optical fiber 72. The reflected light is transmitted to the processing device through the transmitting end of the receiving optical fiber 72. The processing device processes the reflected light to obtain the heart rate information of the user after receiving the reflected light.

The present embodiment not only has the technical effects of the foregoing third embodiment, but also has a simple structure and facilitates the layout and fixation of the optical fiber. Meanwhile, the angle range of the light emitted from the output end of the transmitting optical fiber can be increased and the area of the irradiation area where the light is irradiated on the skin is expanded by utilizing the characteristics of the transmitting light in the optical fiber. The collection efficiency is effectively improved.

Based on the technical idea of the present embodiment, the structure of the present embodiment can also be optimized to further improve the collection efficiency. As shown in FIG. 19b, for example, the end face of the output end of the transmitting optical fiber and the end face of the receiving end of the receiving optical fiber may be disposed to be inclined. The optical fiber wall on the side away from the skin surface is longer than the optical fiber wall on the side adjacent to the skin surface. The protruding portion of the optical fiber wall is used as a reflecting surface. The range of angles at which the output end of the transmitting optical fiber emitting light and the receiving end of the receiving optical fiber receiving light are further increased to increase the luminous flux. As an implementation, the optical fiber wall on the side adjacent to the skin surface can be processed to a light transmission layer. As shown in FIG. 19c, for another example, a reflector plate 737 can be disposed on the fixing plate. The reflector plate 737 is disposed between the output end of the transmitting optical fiber and the receiving end of the receiving optical fiber. The angle range of the output end of the transmitting optical fiber emitting light and the angle range of the receiving end of the receiving optical fiber receiving light are further increased to increase the luminous flux through utilizing the reflector plate 737 as a reflection surface.

Eighth Embodiment

Figure 20A:
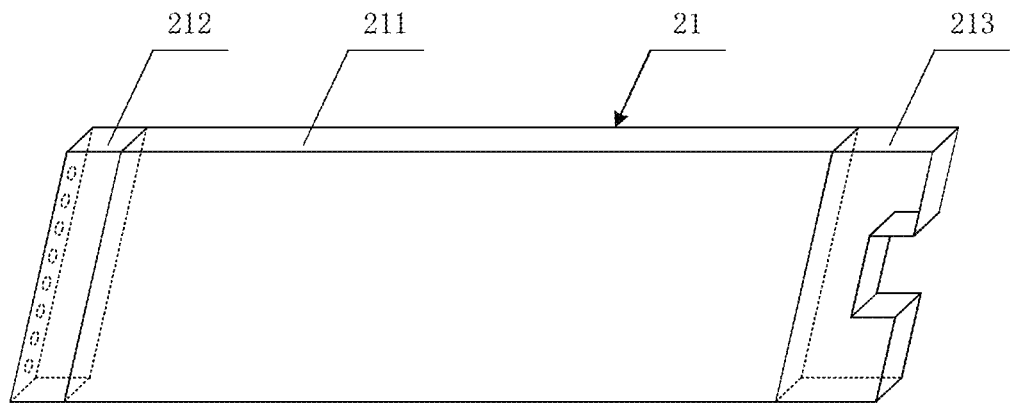
FIGS. 20a to 20c are structural schematic views of a watchband of the present disclosure.
Figure 20B:
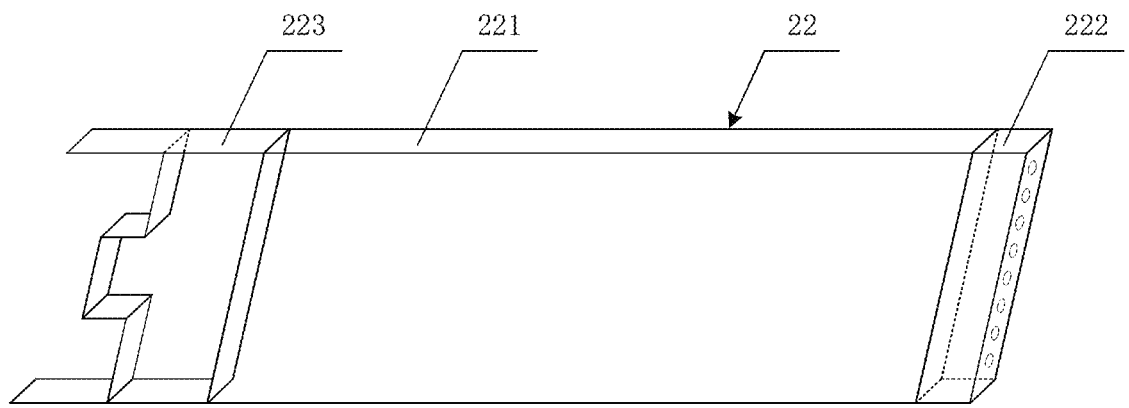
Figure 20C:
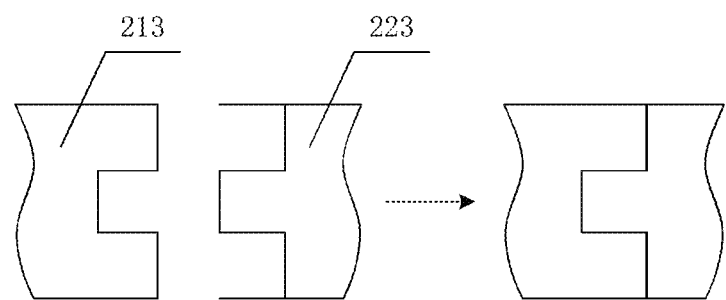

FIGS. 20*a* to 20*c* are structural schematic views of the watchband of the present disclosure. As shown in FIGS. 20*a* and 20*b*, the watchband includes a first watchband 21 and a second watchband 22. The main structure of the first watchband 21 includes a first band body 211, a first interface 212, and a first lock catch 213. The first interface 212 is located at one end of the first band body 211 of the first watchband 21 for connecting with one side of the dial. The first lock catch 213 is located at the other end of the first band body 211 of the first watchband 21 for connecting with the second watchband 22. The main structure of the second watchband 22 includes a second band body 221, a second interface 222, and a second lock catch 223. The second interface 222 is located at one end of the second band body 221 for connecting with the other side of the dial. The second lock catch 223 is located at the other end of the second band body 221 for connecting with the first watchband 21. The blood vessel information collecting device of the foregoing embodiment is disposed in the first band body 211, disposed in the second band body 221, or disposed in the band body 211 and the second band body 221.

The present disclosure makes the watchband of the smart watch of the present disclosure can be replaced by providing the first interface 212 and the second interface 222 on the watchband to connect with the dial. Since the blood vessel information collecting device is disposed in the watchband, even if different people use different dials or the same person replaces different dials at different periods, the heart rate monitoring is not affected. The compatibility is increased, and the field of employment is expanded.

As shown in FIG. 20*c*, the first lock catch 213 and the second lock catch 223 of the present disclosure can adopt a magnet structure, and are connected by magnetic force after being worn. The magnet structures may be respectively disposed on a groove of the first lock catch 213 and a protrusion of the second lock catch 223. In addition, a guide plate may be disposed on the second lock catch 223. The lock catch structure of the present disclosure achieves a quick connection of the first watchband and the second watchband, has a simple structure, and is convenient to use.

The first band body 211 and the second band body 221 of the present disclosure may be made by adopting material such as nylon and flexible plastic etc. A plurality of mounting holes are defined inside of the first band body 211 and the second band body 221. The mounting holes extending along the length direction of the watchband and acting as an optical fiber channel to facilitate the mounting holes to wrap the optical fiber. All the structures of the first interface and the second interface as well as the structures of the first lock catch and the second lock catch etc. can be implemented by adopting the related mature technologies, and details are not described herein again.

A smart watch is provided in the present disclosure. The blood vessel information in the inner side of the wrist of the user is collected by disposing the blood vessel information collecting device in the watchband. Since the blood vessels in the inner side of the wrist are buried shallowly and the blood volume of each blood vessel is uniform, the smart watch of the present disclosure can collect more accurate blood vessel information. The accuracy of the measured heart rate information is relatively high. In addition, since the blood vessel information collecting device is disposed in the watchband, not only is an area that can be disposed large and convenient to lay out, but also the blood vessel information of multiple areas of the wrist can be collected. The accuracy of the heart rate information measurement is further improved. Further, the smart watch of the present disclosure can directly obtain the heart rate information of the user by disposing the processing device without external device assistance. It is convenient and quick to use, suitable for all kinds of people, and has good application prospects.

Ninth Embodiment

Figure 21:
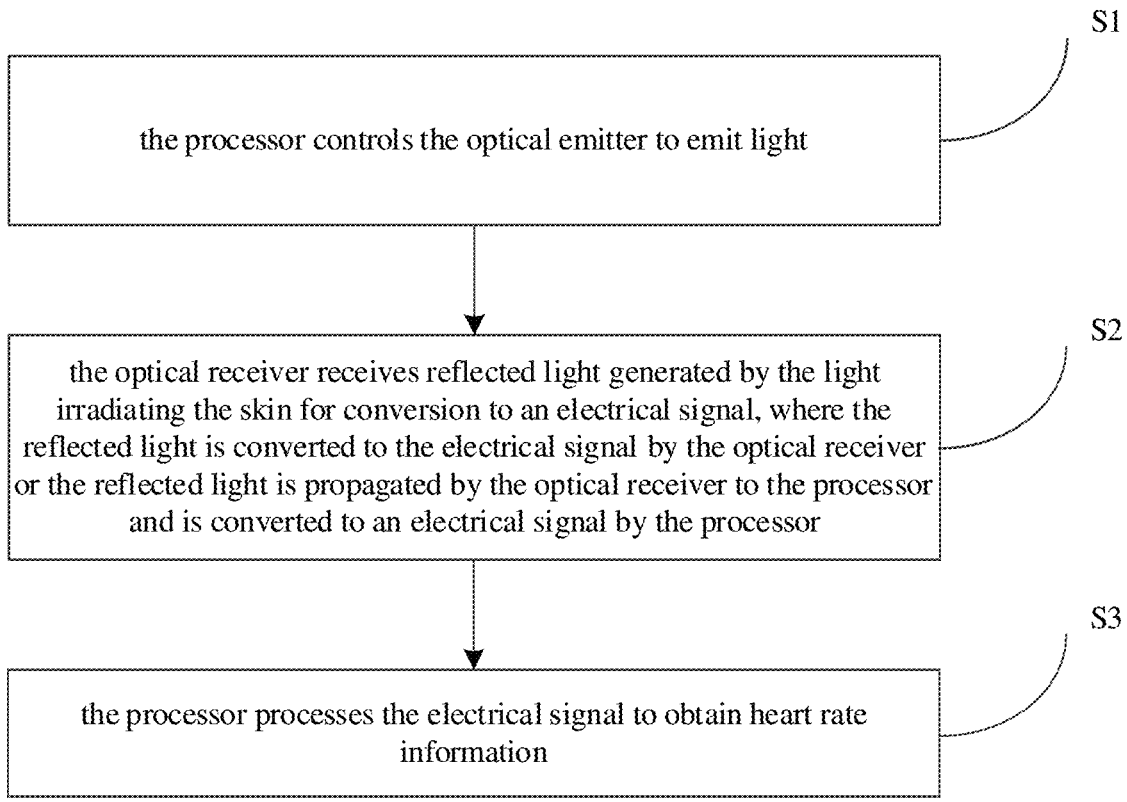
FIG. 21 is a flowchart of a method for measuring a heart rate of an embodiment of the present disclosure.

As shown in FIG. 21, a method for measuring the heart rate information is provided in the present disclosure, which utilizes the smart watch in the above embodiments to measure heart rate information. The above smart watch includes the dial 1, the watchband 2, and the processing device 3. The processing device includes an optical transmitter 31, an optical receiver 32, and a processor 33 connected to the optical transmitter 31 and the optical receiver 32, respectively. The method of measuring heart rate information by the processing device 3 includes the following steps.

S1, the processor controls the optical emitter to emit light.
S2, the optical receiver receives reflected light generated by the light irradiating the skin for conversion to an electrical signal, where the reflected light is converted to the electrical signal by the optical receiver or the reflected light is propagated by the optical receiver to the processor and is converted to an electrical signal by the processor.
S3, the processor processes the electrical signal to obtain heart rate information.

Tenth Embodiment

Figure 22:
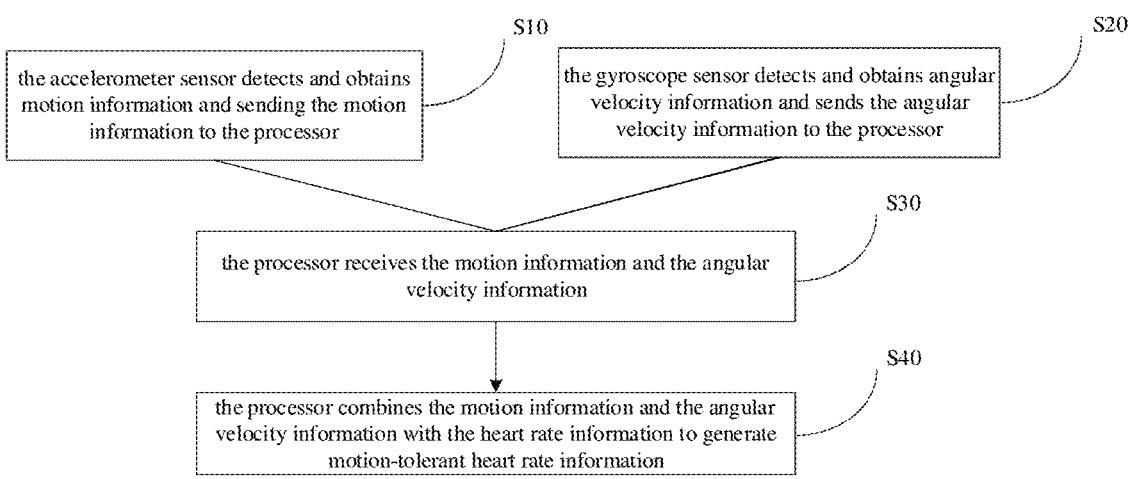
FIG. 22 is a flowchart of a method for measuring a heart rate of an embodiment of the present disclosure.

As shown in FIG. 22, a method for measuring the heart rate information is provided in the present disclosure, which utilizes the smart watch in the above embodiments to measure heart rate information. The above smart watch includes the dial 1, the watchband 2, the processing device 3, the accelerometer sensor 5, and the gyroscope sensor 6. The processing device 3 includes the optical transmitter 31, the optical receiver 32, and the processor 33 connected to the optical transmitter 31 and the optical receiver 32, respectively. The method of measuring heart rate information by the processing device 3 in cooperation with the accelerometer sensor 5 and the gyroscope sensor 6 includes the following steps.

S10, the accelerometer sensor detects and obtains motion information and sending the motion information to the processor.
S20, the gyroscope sensor detects and obtains angular velocity information and sends the angular velocity information to the processor.
S30, the processor receives the motion information and the angular velocity information.
S40, the processor combines the motion information and the angular velocity information with the heart rate information to generate motion-tolerant heart rate information.

Eleventh Embodiment

Figure 23:
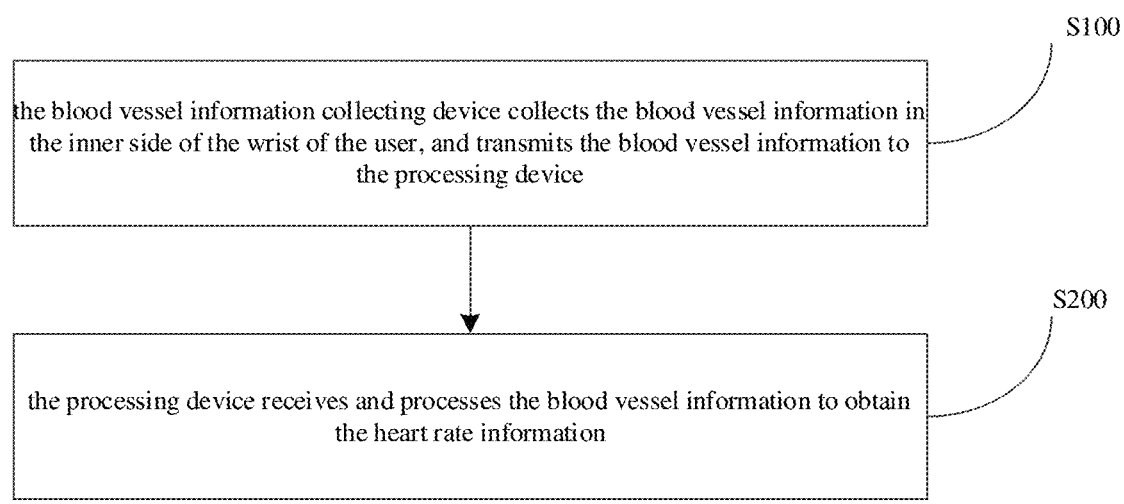
FIG. 23 is a flowchart of a method for measuring a heart rate of an embodiment of the present disclosure.

As shown in FIG. 23, a method for measuring the heart rate information is provided in the present disclosure, which utilizes the smart watch in the above embodiments to measure heart rate information. The above smart watch includes the dial 1, the watchband 2, the processing device 3, and the blood vessel information collecting device 7. The blood vessel information collecting device 7 is disposed in the watchband 2 and configured to collect the blood vessel information in the inner side of the wrist of the user. The processing device 3 is connected with the blood vessel information collecting device 7 and configured to receive and process the blood vessel information to obtain the heart rate information of the user. The method for measuring the heart rate information includes the following steps:

S100, the blood vessel information collecting device collects the blood vessel information in the inner side of the wrist of the user, and transmits the blood vessel information to the processing device.

S200, the processing device receives and processes the blood vessel information to obtain the heart rate information.

The blood vessel information collecting device 7 includes the transmitting optical fiber 71, the receiving optical fiber 72, and the fixing device 73. The transmitting optical fiber 71 is disposed in the watchband 2 and has the input end 711 and the output end 712. The receiving optical fiber 72 is disposed in the watchband 2 and has the receiving end 721 and the transmitting end 722. The fixing device 73 is configured to fix the output end 711 of the transmitting optical fiber 71 and the receiving end 721 of the receiving optical fiber 72. Other structures for the smart watch are the same as those of the smart watch in the above embodiments, and are not described herein again.

Figure 24:
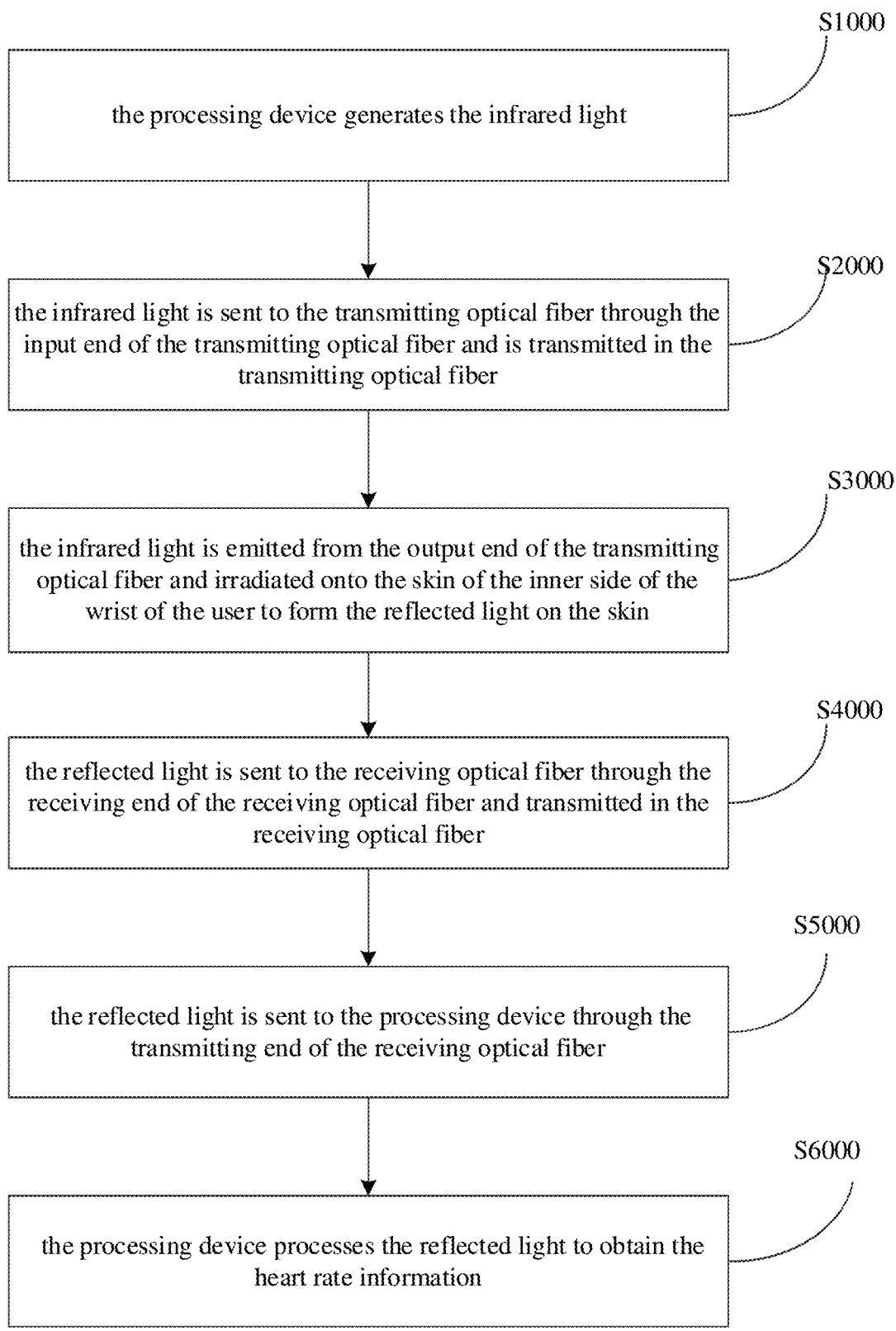
FIG. 24 is a flowchart of a method for measuring a heart rate of an embodiment of the present disclosure.

As shown in FIG. 24, the above method particularly includes the following steps:

S1000, the processing device generates the infrared light.

In some embodiments, the processor can also generate other colors of light, such as green light, but preferably infrared light.

S2000, the infrared light is sent to the transmitting optical fiber through the input end of the transmitting optical fiber and is transmitted in the transmitting optical fiber.

S3000. z.

S4000, the reflected light is sent to the receiving optical fiber through the receiving end of the receiving optical fiber and transmitted in the receiving optical fiber.

S5000, the reflected light is sent to the processing device through the transmitting end of the receiving optical fiber.

S6000, the processing device processes the reflected light to obtain the heart rate information.

Figure 25:
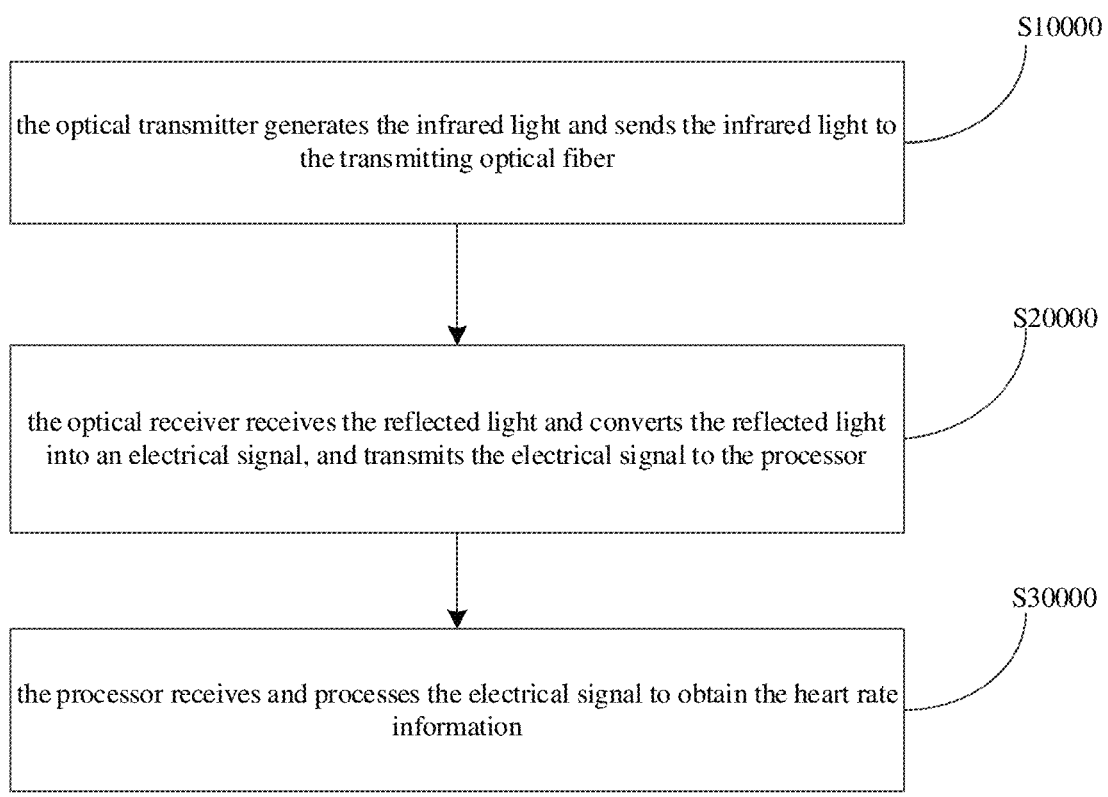
FIG. 25 is a flowchart of a method for measuring a heart rate of an embodiment of the present disclosure.

The processing device in the above embodiment includes the optical transmitter 31, the optical receiver 32, and the processor 33. As shown in FIG. 25, the particular method steps for measuring by utilizing the processing device 3 are as follows:

S10000, the optical transmitter generates the infrared light and sends the infrared light to the transmitting optical fiber;

S20000, the optical receiver receives the reflected light and converts the reflected light into an electrical signal, and transmits the electrical signal to the processor.

S30000, the processor receives and processes the electrical signal to obtain the heart rate information.

In the description of the present disclosure, it should be understood that, the orientation or position relationship indicated by the terms "middle", "upper", "lower", "front", "back", "vertical", "horizontal", "top", "bottom", "inside", "outside", etc., are based on the orientation or positional relationship shown in the accompanying drawings, which are only for convenience of describing the present disclosure and simplifying the description, and do not indicate or imply that the apparatus or component referred to must have a particular orientation and be constructed and operated in a particular orientation, therefore it should not be construed as limiting the disclosure.

In the description of the present disclosure, it should be noted that, unless otherwise expressly stated and limited, terms "mounted", "connected" and "connection" should be understood broadly. For example, it may be a fixed connection, a detachable connection, or an integral connection. It may be a mechanical connection, or may also be an electrical connection. It may be a direct connection, an indirect connection through an intermediate medium, or an internal connection between two components. The particular meanings of the above terms in the present disclosure can be understood in the particular circumstances by those skilled in the art.

Although the embodiments disclosed in the present disclosure are as described above, the described content is merely the embodiments adopted to facilitate the understanding of the present disclosure, and is not intended to limit the present disclosure. Any modification and variation in the form and details of the embodiments may be made by those skilled in the art without departing from the spirit and scope of the disclosure. However, the scope of patent protection of the present disclosure is still subject to the scope defined by the appended claims

What is claimed is:

1. A smart watch, comprising:
a dial;
a watchband connected to the dial; and
a processing device disposed on the dial or inside the watchband; wherein
the processing device comprises:
an optical emitter configured to emit light;
an optical receiver configured to receive reflected light, the reflected light being generated by the light emitted by the optical emitter irradiating a skin for conversion into an electrical signal;
a processor connected to the optical emitter and the optical receiver, respectively, configured to process the electrical signal to obtain heart rate information of a user;
an accelerometer sensor configured to detect and obtain motion information of the user, wherein the motion information comprises at least one of: direction information of the user, location information of the user, and speed variation rate of the user; and
a gyroscope sensor configured to detect and obtain angular velocity information of the user;
wherein the processor is connected to the accelerometer sensor and the gyroscope sensor, respectively;
the accelerometer sensor is configured to send the motion information to the processor;
the gyroscope sensor is configured to send the angular velocity information to the processor; and
the processor is configured to:
receive the motion information and the angular velocity information;
generate motion-tolerant heart rate information by combining the motion information and the angular velocity information with the heart rate information; and
control the smart watch to send a second reminder message in response to the motion-tolerant heart rate information exceeding a first threshold; or, control the smart watch to send a second reminder message in response to the motion-tolerant heart rate information exceeding a second threshold for a predetermined period of time, wherein the first threshold and the second threshold are the same or different, and the second reminder message is configured for reminding the user of the motion-tolerant heart rate information.

2. The smart watch according to claim 1, wherein the processor is configured to control the smart watch to send a first reminder message based on the heart rate information, the first reminder message being configured for reminding the user of the heart rate information.

3. The smart watch according to claim 1, wherein the processor is further configured to:
   use the heart rate information together with the motion information and the angular velocity information as input to a PhotoPlethysmoGraphy (PPG) algorithm; and
   generate the motion-tolerant heart rate information by:
   processing the heart rate information, the motion information, and the angular velocity information using the PPG algorithm, and
   superimposing the processed information onto a PPG waveform.

4. The smart watch according to claim 1, further comprising:
   a blood vessel information collecting device disposed in the watchband and configured to collect blood vessel information from an inner side of a wrist of the user; wherein
   the processing device is connected with the blood vessel information collecting device and is configured to receive and process the blood vessel information to obtain heart rate information of the user; and
   the blood vessel information collecting device comprises:
   a transmitting optical fiber disposed in the watchband having an input end and an output end;
   a receiving optical fiber disposed in the watchband having a receiving end and a transmitting end;
   a fixing device configured to fix the output end of the transmitting optical fiber and the receiving end of the receiving optical fiber; and
   wherein the input end is connected to the processing device, the output end is connected to the fixing device, the receiving end is connected to the fixing device, and the transmitting end is connected to the processing device.

5. The smart watch according to claim 4, wherein the fixing device comprises:
   a fixing plate disposed on a surface of the watchband facing the wrist skin, the fixing plate provided with a plurality of through holes;
   a fixing ring; and
   wherein the output end of the transmitting optical fiber and the receiving end of the receiving optical fiber are configured to extend through the plurality of through holes respectively and be fixed by the fixing ring.

6. The smart watch according to claim 5, wherein the fixing device further comprises:
   a diffusing device disposed on a surface of the fixing plate facing the skin, the diffusing device being configured to correspond to a position of the transmitting optical fiber, and being configured to increase an exit angle of an infrared light output from the transmitting optical fiber; and
   a fixing block configured to connect the diffusing device to the fixing plate.

7. The smart watch according to claim 6, wherein the diffusing device comprises an antistatic layer, a polyethylene terephthalate layer, and a diffusion layer which are sequentially stacked.

8. The smart watch according to claim 5, wherein the fixing device further comprises:
   a spotlight device disposed on a surface of the fixing plate facing the skin, the spotlight device being configured to correspond to a position of the receiving optical fiber, and being configured to improve an angle of a reflected light received by the receiving optical fiber; and
   a fixing block configured to connect the spotlight device to the fixing plate.

9. The smart watch according to claim 5, wherein the fixing device further comprises:
   a diffusing device disposed on a surface of the fixing plate facing the skin, the diffusing device being configured to correspond to a position of the transmitting optical fiber, and being configured to increase an exit angle of an infrared light output from the transmitting optical fiber;
   a spotlight device disposed on the surface of the fixing plate facing the skin, the spotlight device being configured to correspond to a position of the receiving optical fiber, and being configured to increase an angle of a reflected light received by the receiving optical fiber; and
   a fixing block configured to connect the diffusing device and the spotlight device to the fixing plate, respectively.

10. The smart watch according to claim 4, wherein the fixing device comprises:
    a fixing plate disposed inside the watchband; and
    a fixing band configured to fix the output end of the transmitting optical fiber and the receiving end of the receiving optical fiber on the fixing plate.

11. The smart watch according to claim 10, wherein the output end of the transmitting optical fiber is oppositely disposed with the receiving end of the receiving optical fiber.

12. The smart watch according to claim 11, wherein both an end face of the output end of the transmitting optical fiber and an end face of the receiving end of the receiving optical fiber are perpendicular to a plane of the fixing plate.

13. The smart watch according to claim 10, wherein the fixing device further comprises a reflector plate disposed between the output end of the transmitting optical fiber and the receiving end of the receiving optical fiber.

14. The smart watch according to claim 10, wherein, in the output end of the transmitting optical fiber and the receiving end of the receiving optical fiber, an optical fiber wall on the side away from the skin is longer than an optical fiber wall on the side adjacent to the skin.

15. A method for measuring heart rate information using the smart watch according to claim 4, comprising:
    generating, by the processing device, an infrared light, wherein:
    the infrared light is sent to the transmitting optical fiber through the input end of the transmitting optical fiber and transmitted in the transmitting optical fiber;
    the infrared light is emitted from the output end of the transmitting optical fiber and irradiates onto skin of the inner side of the wrist of the user to form a reflected light on the skin;
    the reflected light is sent to the receiving optical fiber through the receiving end of the receiving optical fiber and is transmitted in the receiving optical fiber; and
    the reflected light is sent to the processing device through the transmitting end of the receiving optical fiber; and processing, by the processing device, the reflected light to obtain the heart rate information.

16. A method for measuring heart rate information using a smart watch, comprising:
providing the smart watch, wherein the smart watch comprises:
a dial;
a watchband;
a processing device disposed on the dial or inside the watchband, the processing device comprising an optical emitter, an optical receiver, and a processor connected the optical emitter and the optical receiver, respectively;
an accelerometer sensor; and
a gyroscope sensor;
emitting, by the optical emitter, light;
receiving, by the optical receiver, reflected light that is generated by the light irradiating a skin for conversion into an electrical signal;
processing, by the processor, the electrical signal to obtain heart rate information of a user;
detecting and obtaining, by the accelerometer sensor, motion information of the user;
sending, by the accelerometer sensor, the motion information to the processor;
detecting and obtaining, by the gyroscope sensor, angular velocity information of the user;
sending, by the gyroscope sensor, the angular velocity information to the processor;
receiving, by the processor, the motion information and the angular velocity information;
generating, by the processor, motion-tolerant heart rate information by combining the motion information and the angular velocity information with heart rate information; and
control, by the processor, the smart watch to send a second reminder message in response to the motion-tolerant heart rate information exceeding a first threshold; or,
control, by the processor, the smart watch to send a second reminder message in response to the motion-tolerant heart rate information exceeding a second threshold for a predetermined period of time, wherein the first threshold and the second threshold are the same or different, and the second reminder message is configured for reminding the user of the motion-tolerant heart rate information.

17. A method for measuring heart rate information using a smart watch, comprising:
providing the smart watch, wherein the smart watch comprises:
a dial;
a watchband;
a processing device disposed on the dial or inside the watchband, the processing device comprising an optical emitter, an optical receiver, and a processor connected the optical emitter and the optical receiver, respectively;
an accelerometer sensor; and
a gyroscope sensor;
detecting and obtaining, by the accelerometer sensor, motion information of the user;
sending, by the accelerometer sensor, the motion information to the processor;
detecting and obtaining, by the gyroscope sensor, angular velocity information of the user;
sending, by the gyroscope sensor, the angular velocity information to the processor;
receiving, by the processor, the motion information and the angular velocity information;
generating, by the processor, motion-tolerant heart rate information by combining the motion information and the angular velocity information with heart rate information; and
control, by the processor, the smart watch to send a second reminder message in response to the motion-tolerant heart rate information exceeding a first threshold; or,
control, by the processor, the smart watch to send a second reminder message in response to the motion-tolerant heart rate information exceeding a second threshold for a predetermined period of time, wherein the first threshold and the second threshold are the same or different, and the second reminder message is configured for reminding the user of the motion-tolerant heart rate information.

* * * * *